United States Patent
Choi et al.

(10) Patent No.: US 11,835,622 B2
(45) Date of Patent: Dec. 5, 2023

(54) METHOD AND DEVICE TO PROCESS RADAR SIGNAL

(71) Applicant: SAMSUNG ELECTRONICS CO., LTD., Suwon-si (KR)

(72) Inventors: Sungdo Choi, Suwon-si (KR); Byung Kwan Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 113 days.

(21) Appl. No.: 17/082,332

(22) Filed: Oct. 28, 2020

(65) Prior Publication Data

US 2021/0199797 A1 Jul. 1, 2021

(30) Foreign Application Priority Data

Dec. 26, 2019 (KR) .................. 10-2019-0175440

(51) Int. Cl.
  G01S 13/931 (2020.01)
  G01S 7/04 (2006.01)
  (Continued)

(52) U.S. Cl.
  CPC .............. G01S 13/931 (2013.01); G01S 7/04 (2013.01); G01S 13/72 (2013.01); G01S 13/89 (2013.01)

(58) Field of Classification Search
  CPC .... G01S 13/931; G01S 13/343; G01S 13/345; G01S 13/26; G01S 13/72; G01S 13/89;
  (Continued)

(56) References Cited

U.S. PATENT DOCUMENTS

| | | | | |
|---|---|---|---|---|
| 2,423,305 A | * | 7/1947 | Fletcher | G01S 1/302 342/394 |
| 4,368,469 A | * | 1/1983 | Ott | G01S 3/46 342/368 |

(Continued)

FOREIGN PATENT DOCUMENTS

| | | | | |
|---|---|---|---|---|
| DE | 102011086202 A1 | * | 5/2012 | ........... G01S 13/345 |
| DE | 10 2017 207 604 A1 | | 11/2018 | |

(Continued)

OTHER PUBLICATIONS

Radar Tutorial found at https://www.radartutorial.eu/index.en.html Publisher: Christian Wolff. Text is available under the GNU Free Documentation License, and the Creative Commons Attribution-Share Alike 3.0 Unported license, additional terms may apply. (Online since Nov. 1998). (Year: 2018).*

(Continued)

*Primary Examiner* — Vladimir Magloire
*Assistant Examiner* — Michael W Justice
(74) *Attorney, Agent, or Firm* — NSIP Law

(57) ABSTRACT

A radio detection and ranging (radar) signal processing device obtains radar data by compensating for a change in a carrier frequency of a sensed radar signal, and outputs a radar image map based on the obtained radar data. The radar signal processing method includes obtaining a beat frequency signal based on a radar transmission signal generated based on a frequency modulation model and a radar reflection signal obtained from the radar transmission signal being reflected from an object, and generating radar data by compensating the beat frequency signal for a carrier frequency change by the frequency modulation model.

25 Claims, 12 Drawing Sheets

(51) Int. Cl.
*G01S 13/72* (2006.01)
*G01S 13/89* (2006.01)

(58) Field of Classification Search
CPC .......... G01S 13/34; G01S 13/42; G01S 7/354; G01S 7/356; G01S 7/40; G01S 2013/0245; G01S 2013/0254; G01S 2013/0263
USPC .................................. 342/70, 128, 174, 113
See application file for complete search history.

(56) References Cited

U.S. PATENT DOCUMENTS

| | | | | |
|---|---|---|---|---|
| 4,546,355 A * | 10/1985 | Boles | ...................... | G01S 13/66 342/25 C |
| 4,563,686 A * | 1/1986 | Boles | ...................... | G01S 13/90 342/25 C |
| 5,111,208 A * | 5/1992 | Lopez | ...................... | H01Q 3/267 342/174 |
| 5,343,404 A | 8/1994 | Girgis | | |
| 5,581,582 A * | 12/1996 | Choi | ...................... | H03J 7/02 329/307 |
| 5,757,307 A * | 5/1998 | Nakatani | ................. | G01S 13/42 342/107 |
| 5,774,087 A | 6/1998 | Rose | | |
| 5,999,120 A * | 12/1999 | Yamada | ................. | G01S 7/4021 342/368 |
| 6,091,356 A * | 7/2000 | Sanders | ................. | H03B 23/00 342/99 |
| 6,188,352 B1 * | 2/2001 | Choi | ...................... | H04B 7/0865 342/378 |
| 6,317,073 B1 * | 11/2001 | Tamatsu | ................. | G01S 13/44 342/128 |
| 6,489,923 B1 * | 12/2002 | Bevan | ................... | H01Q 1/246 342/378 |
| 6,529,162 B2 * | 3/2003 | Newberg | ............... | H01Q 3/2682 342/372 |
| 6,642,888 B2 * | 11/2003 | Kishigami | ................. | G01S 3/74 342/417 |
| 6,750,809 B1 * | 6/2004 | Cho | ........................ | G01S 13/90 342/204 |
| 6,825,800 B1 * | 11/2004 | Dudley | ................... | G01S 7/282 342/194 |
| 6,828,929 B2 * | 12/2004 | Barbella | ................. | G01S 13/24 342/146 |
| 6,828,933 B1 * | 12/2004 | Doerry | ................... | G01S 7/4008 342/194 |
| 6,836,240 B1 * | 12/2004 | Dubbert | ................. | G01S 7/282 342/194 |
| 6,836,245 B2 * | 12/2004 | Kishigami | ................. | G01S 3/74 342/417 |
| 6,891,497 B2 * | 5/2005 | Coleman, Jr. | ......... | G01S 7/4017 342/25 R |
| 6,897,807 B2 * | 5/2005 | Kishigami | ................. | G01S 3/74 342/417 |
| 7,280,067 B2 * | 10/2007 | Chiodini | ................. | G01S 7/021 342/194 |
| 7,453,398 B2 * | 11/2008 | Rouzeaud | ............... | G01S 7/4004 342/368 |
| 7,495,604 B2 * | 2/2009 | Yamano | ................. | G01S 7/4021 342/107 |
| 7,539,273 B2 * | 5/2009 | Struckman | ........... | H04B 7/0854 455/67.11 |
| 7,639,171 B2 * | 12/2009 | Alland | ...................... | H01Q 3/24 342/25 R |
| 7,737,885 B2 * | 6/2010 | Winkler | ................. | G01S 7/4008 342/100 |
| 7,834,804 B2 * | 11/2010 | Nakanishi | ............. | G01S 13/345 342/128 |
| 8,446,312 B2 * | 5/2013 | Kanamoto | ............... | G01S 13/04 342/149 |
| 8,471,758 B2 * | 6/2013 | Samuel | ................... | G01S 13/90 342/25 A |
| 8,730,096 B2 * | 5/2014 | Kanamoto | ................. | G01S 3/74 342/107 |
| 8,730,099 B2 * | 5/2014 | Kanamoto | ................. | G01S 3/74 342/147 |
| 8,976,061 B2 * | 3/2015 | Chowdhury | .......... | G01S 13/584 343/700 R |
| 9,383,442 B2 * | 7/2016 | Hampikian | .......... | G01S 13/584 |
| 9,400,325 B2 * | 7/2016 | Millar | ...................... | G01S 7/42 |
| 9,551,786 B2 * | 1/2017 | Seller | ...................... | G01S 13/74 |
| 10,001,555 B2 * | 6/2018 | Seller | ................... | G01S 13/343 |
| 10,503,122 B2 * | 12/2019 | Testi | ...................... | G04F 10/005 |
| 10,563,758 B2 * | 2/2020 | Lee | ...................... | F16H 61/0213 |
| 10,627,483 B2 * | 4/2020 | Rao | ................... | G01S 13/343 |
| 10,775,493 B2 * | 9/2020 | Santra | ................... | G01S 13/904 |
| 11,003,142 B2 * | 5/2021 | Testi | ...................... | G04F 10/06 |
| 11,092,683 B2 * | 8/2021 | Wu | ........................ | G01S 13/584 |
| 11,187,784 B2 * | 11/2021 | Chi | ...................... | G01S 7/352 |
| 11,204,410 B2 * | 12/2021 | Jansen | ................... | G01S 13/34 |
| 11,269,049 B2 * | 3/2022 | Wu | ........................ | G01S 13/42 |
| 11,340,330 B2 * | 5/2022 | Schrattenecker | ......... | G01S 7/35 |
| 11,415,664 B2 * | 8/2022 | Hammes | ............... | H01Q 21/293 |
| 11,422,251 B2 * | 8/2022 | Schoor | ................... | G01S 13/34 |
| 11,428,796 B2 * | 8/2022 | Nam | ...................... | G01S 7/35 |
| 11,428,805 B2 * | 8/2022 | Kishigami | ............ | G01S 13/343 |
| 2002/0126045 A1 * | 9/2002 | Kishigami | ................. | G01S 3/74 342/417 |
| 2002/0175859 A1 * | 11/2002 | Newberg | ............... | H01Q 3/2682 342/375 |
| 2004/0027282 A1 * | 2/2004 | Kishigami | ................. | G01S 3/74 342/417 |
| 2004/0150552 A1 * | 8/2004 | Barbella | ................. | G01S 13/24 342/111 |
| 2004/0189523 A1 * | 9/2004 | Kishigami | ................. | G01S 3/74 342/417 |
| 2005/0012659 A1 * | 1/2005 | Coleman, Jr. | ......... | G01S 7/4017 342/25 R |
| 2005/0270218 A1 * | 12/2005 | Chiodini | ................. | G01S 7/021 342/194 |
| 2006/0194544 A1 * | 8/2006 | Struckman | ........... | H04B 7/0854 455/67.11 |
| 2008/0030412 A1 * | 2/2008 | Rouzeau | ............... | G01S 7/2813 343/703 |
| 2008/0036645 A1 * | 2/2008 | Yamano | ................. | G01S 7/4021 342/372 |
| 2009/0033538 A1 * | 2/2009 | Winkler | ................. | G01S 7/4008 342/21 |
| 2009/0085800 A1 * | 4/2009 | Alland | ................... | G01S 13/343 342/25 R |
| 2009/0224963 A1 * | 9/2009 | Nakanishi | ............. | G01S 13/345 342/200 |
| 2010/0271254 A1 * | 10/2010 | Kanamoto | ................. | G01S 3/74 342/146 |
| 2012/0200453 A1 * | 8/2012 | Brosche | ................. | H03M 3/47 342/175 |
| 2012/0268309 A1 * | 10/2012 | Samuel | ................... | F41G 7/2286 342/62 |
| 2013/0027240 A1 * | 1/2013 | Chowdhury | .......... | G01S 13/345 342/175 |
| 2013/0222173 A1 * | 8/2013 | Kanamoto | ............. | G01S 13/04 342/27 |
| 2013/0229301 A1 * | 9/2013 | Kanamoto | ............ | G01S 13/584 342/158 |
| 2014/0225762 A1 * | 8/2014 | Seller | ................... | G01S 13/876 342/125 |
| 2015/0177371 A1 * | 6/2015 | Abbasi | ................... | G01S 13/88 342/174 |
| 2015/0323660 A1 * | 11/2015 | Hampikian | .......... | G01S 13/58 342/109 |
| 2016/0003940 A1 * | 1/2016 | Seller | ....................... | G01S 7/40 342/132 |
| 2016/0033625 A1 | 2/2016 | Floyd et al. | | |
| 2016/0131752 A1 | 5/2016 | Jansen et al. | | |
| 2016/0146925 A1 * | 5/2016 | Millar | ...................... | G01S 13/44 342/113 |
| 2016/0254830 A1 | 9/2016 | Corbalis et al. | | |
| 2016/0377711 A1 * | 12/2016 | Arage | ................... | G01S 13/582 342/118 |

(56) References Cited

U.S. PATENT DOCUMENTS

| | | | |
|---|---|---|---|
| 2017/0276779 A1* | 9/2017 | Seller | G01S 13/84 |
| 2018/0011170 A1* | 1/2018 | Rao | G01S 13/92 |
| 2018/0266545 A1* | 9/2018 | Lee | F16H 61/0213 |
| 2018/0267131 A1* | 9/2018 | Simileysky | H04W 4/026 |
| 2018/0267160 A1 | 9/2018 | Slemp | |
| 2018/0335512 A1 | 11/2018 | Brankovic et al. | |
| 2019/0170870 A1 | 6/2019 | Marsch et al. | |
| 2019/0178983 A1 | 6/2019 | Lin et al. | |
| 2019/0235066 A1* | 8/2019 | Iida | G01S 13/003 |
| 2019/0302253 A1* | 10/2019 | Santra | G01S 13/88 |
| 2019/0339359 A1* | 11/2019 | Wang | G01S 13/343 |
| 2019/0361091 A1* | 11/2019 | Chi | G01S 13/536 |
| 2020/0003862 A1* | 1/2020 | Doaré | H04L 7/065 |
| 2020/0011968 A1* | 1/2020 | Hammes | G01S 13/003 |
| 2020/0072940 A1* | 3/2020 | Schrattenecker | G01S 7/35 |
| 2020/0081110 A1* | 3/2020 | Nam | G01S 13/42 |
| 2020/0209352 A1* | 7/2020 | Rao | G01S 13/92 |
| 2020/0233076 A1* | 7/2020 | Chen | G01S 7/4865 |
| 2020/0256948 A1* | 8/2020 | Jansen | G01S 13/34 |
| 2020/0300965 A1* | 9/2020 | Wu | G01S 7/2883 |
| 2020/0300995 A1* | 9/2020 | Wu | G01S 7/41 |
| 2020/0301002 A1* | 9/2020 | Wu | G01S 7/41 |
| 2020/0393553 A1* | 12/2020 | Kishigami | G01S 7/036 |
| 2021/0156980 A1* | 5/2021 | Stettiner | G01S 13/584 |
| 2021/0156981 A1* | 5/2021 | Stettiner | G01S 7/0232 |
| 2021/0156982 A1* | 5/2021 | Stettiner | G01S 13/931 |
| 2021/0364626 A1* | 11/2021 | Schoor | G01S 13/931 |
| 2022/0236406 A1* | 7/2022 | Wintermantel | G01S 13/343 |
| 2022/0244349 A1* | 8/2022 | Wintermantel | G01S 7/35 |
| 2022/0365196 A1* | 11/2022 | Nam | G01S 13/584 |
| 2022/0381903 A1* | 12/2022 | Kishigami | G01S 13/534 |
| 2023/0003870 A1* | 1/2023 | Kishigami | G01S 13/42 |

FOREIGN PATENT DOCUMENTS

| | | | | |
|---|---|---|---|---|
| JP | 2003315447 A | * | 11/2003 | G01S 13/42 |
| KR | 10-2018-0081283 A | | 7/2018 | |
| WO | WO 2018/069120 A1 | | 4/2018 | |

OTHER PUBLICATIONS

Partial European Search Report dated May 7, 2021 in counterpart European Patent Application No. 20207343.3 (12 pages in English).

Extended European Search Report dated Sep. 29, 2021 in counterpart European Patent Application No. 20207343.3 (12 pages in English).

Moghaddasi, Jaber., Multifunction Transceiver Architecture and Technology for Future Wireless Systems, Université De Montréal, 2017 (pp. 1-226).

* cited by examiner

METHOD AND DEVICE TO PROCESS RADAR SIGNAL

CROSS-REFERENCE TO RELATED APPLICATIONS

This application claims the benefit under 35 USC § 119(a) of Korean Patent Application No. 10-2019-0175440 filed on Dec. 26, 2019, in the Korean Intellectual Property Office, the entire disclosure of which is incorporated herein by reference for all purposes.

BACKGROUND

1. Field

The following description relates to technology for processing a radio detection and ranging (radar) signal.

2. Description of Related Art

Advanced driver assistance systems (ADAS) are used to enhance safety and convenience for drivers by implementing sensors provided inside or outside a vehicle. The ADAS may assist a driver by detecting objects and alerting the driver of hazardous road conditions.

The sensors used for the ADAS may include a camera, an infrared sensor, an ultrasonic sensor, a light detection and ranging (lidar) sensor, and a radio detection and ranging (radar) sensor. Among these, the radar sensor may reliably measure an object present adjacent to a vehicle without being affected by environmental conditions including, for example, weather, compared to optical sensors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a radio detection and ranging (radar) signal processing method, including obtaining a beat frequency signal based on a radar transmission signal generated based on a frequency modulation model and a radar reflection signal obtained from the radar transmission signal being reflected from an object, and generating radar data by compensating the beat frequency signal for a carrier frequency change by the frequency modulation model.

The radar signal processing method of claim 1, wherein the obtaining of the beat frequency signal may include obtaining sampling data by sampling the beat frequency signal at sampling points, and the generating of the radar data may include compensating a sampling value corresponding to each of the sampling points in the sampling data for an error due to a carrier frequency corresponding to a corresponding sampling point.

The generating of the radar data may include applying, to the beat frequency signal, a phase normalization model configured to normalize a carrier frequency of the beat frequency signal to be a reference frequency.

The phase normalization model may include combining a result of converting the beat frequency signal in a time domain to data in another domain based on a carrier frequency based on the frequency modulation model, and a result of inversely converting the data in the other domain into the time domain based on the reference frequency.

The other domain may include an angle domain.

The phase normalization model may include phase normalization matrices respectively corresponding to sampling points of the beat frequency signal.

The phase normalization model may include a first matrix operation that converts a value in a time domain corresponding to each of sampling points of the beat frequency signal to angle information using a carrier frequency corresponding to a corresponding sampling point of the frequency modulation model, and a second matrix operation that inversely converts the angle information into the time domain using the reference frequency.

The radar signal processing method may include radiating the radar transmission signal comprising a chirp signal of which a carrier frequency may be modulated based on the frequency modulation model, and sensing the radar reflection signal.

The sensing of the radar reflection signal may include sensing the radar reflection signal individually by receiving sub-antennas in a radar sensor.

The obtaining of the beat frequency signal may include calculating the beat frequency signal corresponding to a frequency difference between the radar transmission signal and the radar reflection signal.

The frequency modulation model may be a model having a pattern in which a carrier frequency changes linearly or a model having a pattern in which a carrier frequency changes nonlinearly.

The radar signal processing method may include calculating at least one of angle-of-arrival (AoA) information or range information from the radar data.

The radar signal processing method may include generating a radar image map of a surrounding based on the at least one of the AoA information or the range information.

The radar signal processing method may include visualizing the radar image map through a display.

The radar signal processing method may include changing at least one of a speed, an acceleration, or steering of a vehicle based on the at least one of the AoA information or the range information.

In another general aspect, there is provided a radio detection and ranging (radar) signal processing device, including a radar sensor configured to radiate a radar transmission signal generated based on a frequency modulation model, and to sense a radar reflection signal from the radar transmission signal being reflected from an object, and a processor configured to obtain a beat frequency signal based on the radar transmission signal and the radar reflection signal, to generate radar data by compensating the beat frequency signal for a carrier frequency change by the frequency modulation model, and to calculate at least one of angle-of-arrival (AoA) information or range information from the radar data.

In another general aspect, there is provided a signal processing method including generating and radiating a transmission signal of which a frequency changes within a band, obtaining a reflection signal from the transmission signal being reflected from an object, obtaining a beat frequency signal at sampling points based on the transmission signal and the reflection signal, compensating the beat frequency signal for values corresponding to the sampling points and to which a frequency change of the transmission signal is applied, and calculating an angle-of-arrival (AoA) of the object using the compensated beat frequency signal.

The band may be greater than or equal to 2 gigahertz (GHz).

The at least three antennas may obtain the reflection signal.

The antennas may be equidistant from each other.

A frequency of the transmission signal may change linearly in the band.

A resolving power of the AoA may be less than or equal to 1 degree)(°.

The compensating of the beat frequency signal for the values corresponding to the sampling points and to which the frequency change of the transmission signal is applied may include applying a phase normalization matrix to which a frequency change at each of the sampling points to sampling data corresponding to a corresponding sampling point of the beat frequency signal.

The phase normalization matrix corresponding to each of the sampling points may be a matrix based on a combination of a first matrix operation that converts a value in a time domain corresponding to the sampling point in the sampling data to a value in another domain using a frequency at the sampling point and a second matrix operation that inversely converts the value in the other domain into the time domain using a reference frequency.

The other domain may include an angle domain.

Other features and aspects will be apparent from the following detailed description, the drawings, and the claims.

Figure 1:
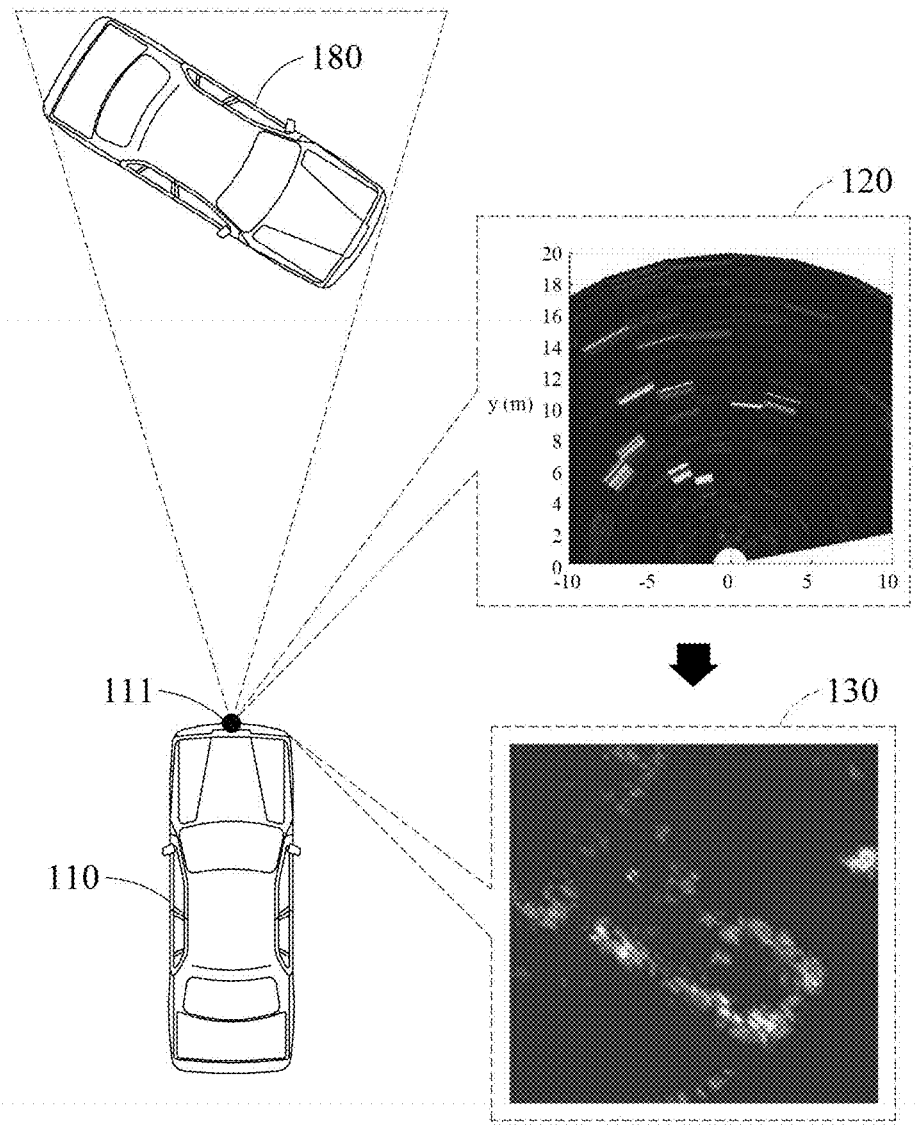
FIG. 1 illustrates an example of recognizing a surrounding environment through a radio detection and ranging (radar) signal processing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween. Likewise, similar expressions, for example, "between" and "immediately between," and "adjacent to" and "immediately adjacent to," are also to be construed in the same way. As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

The terminology used herein is for describing various examples only and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

The use of the term "may" herein with respect to an example or embodiment (e.g., as to what an example or embodiment may include or implement) means that at least one example or embodiment exists where such a feature is included or implemented, while all examples are not limited thereto.

Also, in the description of example embodiments, detailed description of structures or functions that are thereby known after an understanding of the disclosure of the present application will be omitted when it is deemed that such description will be redundant.

Hereinafter, examples will be described in detail with reference to the accompanying drawings, and like reference numerals in the drawings refer to like elements throughout.

Advanced driver assistance systems (ADAS) may be used to enhance safety and convenience for a driver by implementing sensors provided inside or outside a vehicle. The sensors applicable to the ADAS may include, for example, a camera, a millimeter wave (mmWave) radio detection and ranging (radar) sensor, an infrared sensor, an ultrasonic sensor, and a light detection and ranging (lidar) sensor. The sensors of different types may have different sensing ranges and functions. Hereinafter, technology using a radar signal, which is one type of radio frequency (RF) signal, will be described.

FIG. 1 illustrates an example of recognizing a surrounding environment through a radar signal processing method.

In the example of FIG. 1, a radar signal processing device 110 may detect a range to an object 180 by analyzing a radar signal received by a radar sensor 111. The term "range" used herein may indicate a distance, for example, a range from A to B may indicate a distance from A to B, and a range between A and B may indicate a distance between A and B. The terms "range" and "distance" may thus be used interchangeably. The radar sensor 111 may be provided inside or outside the radar signal processing device 110. The radar signal processing device 110 may detect the range to the object 180 based on data collected by other sensors, for example, an image sensor, in addition to the radar signal received from the radar sensor 111.

The term "resolving power" used herein may indicate a capability of a device, for example, a sensor and a radar, to identify a small difference, for example, a capability to discriminate two objects located separately from each other. The resolving power may indicate a minimum unit for identifying a difference, and may be represented by for example, "resolving power=(minimum scale unit for identifying)/(overall operating range)". Thus, the smaller a resolving power value of a device, the more accurate result may be output by the device. The resolving power value may also be referred to as a resolving power unit. For example, when the resolving power value of the device is small, the device may identify a smaller unit, and thus output a result with an increased resolution and accuracy. Conversely, when the resolving power value of the device is great, the device may not identify a smaller unit, and thus output a result with a reduced resolution and accuracy.

The radar signal processing device 110 may be provided in a vehicle, for example. The vehicle may perform an operation, such as, for example, adaptive cruise control (ACC), autonomous emergency braking (AEB), blind spot detection (BSD), accident avoidance, and lane detection, based on the range detected by the radar signal processing device 110.

Further, the radar signal processing device 110 may generate a nearby map 130 of surroundings in addition to detecting a range. The map 130 may indicate locations of targets present around the radar signal processing device 110, and such nearby targets may include dynamic objects such as vehicles and human beings, or stationary or background objects such as guardrails and traffic lights, as only examples.

To generate the map 130, single scanning techniques may be used. Through single scanning, the radar signal processing device 110 may obtain a single scan image 120 from a sensor and generate the map 130 from the obtained single scan image 120. The single scan image 120 may be generated from a radar signal sensed by a single radar sensor 111 and may represent, at a relatively high resolving power, ranges or distances indicated by radar signals received from an elevation angle. For example, a horizontal axis of the single scan image 120 in the example of FIG. 1 indicates a steering angle of the radar sensor 111, and a vertical axis of the single scan image 120 indicates a range from the radar sensor 111 to a target. The format of a single scan image is not limited to that illustrated in FIG. 1, and may be represented by another format based on various examples.

The steering angle may indicate an angle corresponding to a direction from the radar signal processing device 110 towards a target point. For example, the steering angle may be an angle between a driving or traveling direction of the radar signal processing device 110 and the target point based on the radar signal processing device 110, for example, the vehicle. The steering angle is described herein based mainly on a horizontal angle, but not limited thereto. The steering angle may also be applied to an elevation angle.

The radar signal processing device 110 may obtain information about a shape of a target through a multi-radar map. The multi-radar map may be generated by combining a plurality of radar scan images. For example, the radar signal processing device 110 may generate the map 130 by spatiotemporally combining multiple radar scan images obtained as the radar sensor 111 moves. The map 130 may be a type of a radar image map and used for pilot parking, for example.

To generate the map 130, angle-of-arrival (AoA) information may be used. The AoA information may indicate information indicating a direction in which a radar signal reflected from a target point is received. The radar signal processing device 110 may identify a direction in which the target point is present based on the radar sensor 111 using the AoA information. Thus, the AoA information may be used to generate radar scan data and a nearby map of surroundings.

Radar data may include raw data sensed by the radar sensor 111. Hereinafter, a method of removing a phase error that may occur in raw data by a change in a carrier frequency will be described.

Figure 2:
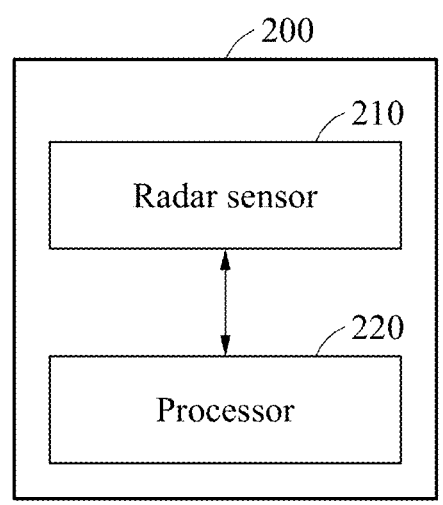
FIG. 2 illustrates an example of a radar signal processing device.

FIG. 2 illustrates an example of a radar signal processing device.

Referring to FIG. 2, a radar signal processing device 200 includes a radar sensor 210 and a processor 220.

The radar sensor 210 may sense radar data. The radar sensor 210 may externally radiate a generated radar signal, and receive a reflected signal that is returned to the radar sensor 210 after the radiated radar signal is reflected from a target point, for example, an object. The radar signal radiated externally may be referred to herein as a radar transmission signal, and the reflected signal may be referred to herein as a radar reflection signal. The radar transmission signal may include a chirp signal of which a carrier frequency is modulated based on a frequency modulation model. The radar transmission signal may have a frequency that changes within a preset band. For example, the frequency of the radar transmission signal may change linearly in the band. The radar sensor 210 may include an antenna corresponding to a plurality of receiving channels (indicated as Rx in the drawings). Signals received respectively through the receiving channels may have different phases based on a receiving direction in which each of the signals is received. The radar sensor 210 will be described in greater detail hereinafter with reference to FIG. 3.

The processor 220 may generate a beat frequency signal based on the radar transmission signal and the radar reflection signal. The beat frequency signal may indicate a signal having a frequency corresponding to a frequency difference between the radar transmission signal and the radar reflection signal. The processor 220 may obtain the beat frequency signal at a plurality of preset sampling points based on the radar transmission signal and the radar reflection signal. The processor 220 may generate radar data by compensating the beat frequency signal for a carrier frequency change by the frequency modulation model. For example, the processor 220 may compensate the beat frequency signal for values to which a frequency change of the radar transmission signal corresponding to the sampling points is applied. Such a compensation of a beat frequency for a carrier frequency will be described in detail with reference to FIGS. 5 through 11. The processor 220 may calculate AoA information and range information from the generated radar data. The AoA information may be information indicating a direction in which a radar signal reflected from a target point is received. The range information may be information indicating a range or distance to the target point from which the radar signal is reflected.

Hereinafter, a radar transmission signal and a radar reflection signal will be described along with a radar signal with reference to FIG. 3.

Figure 3:
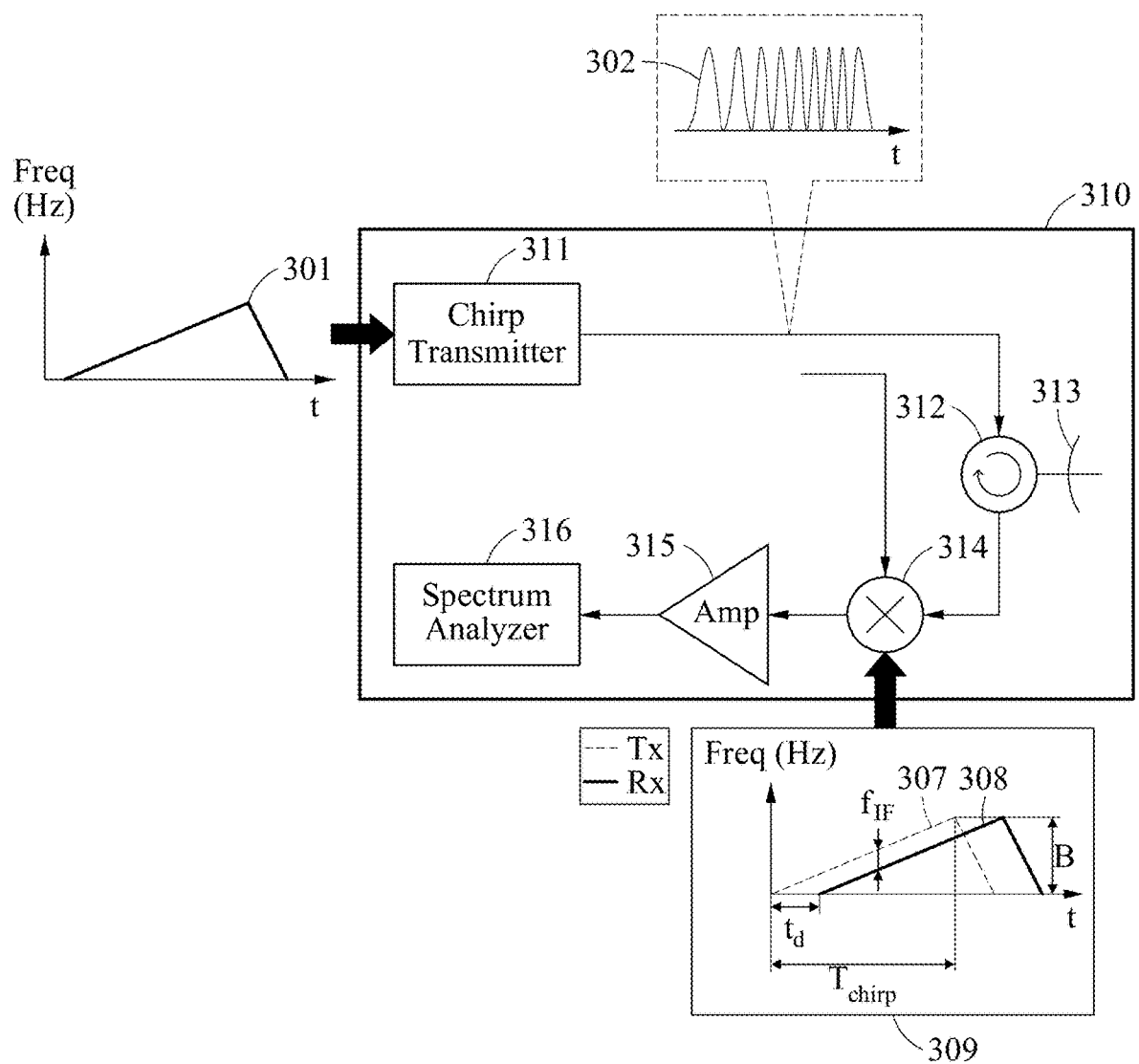
FIG. 3 illustrates an example of a radar sensor.

FIG. 3 illustrates an example of a radar sensor.

Referring to FIG. 3, a radar sensor 310 may radiate a signal through an antenna 313 and receive a signal through the antenna 313. Although the antenna 313 is illustrated as a single antenna in FIG. 3 for the convenience of description, the number of antennas is not limited to the illustrated example. For example, a transmitting antenna and a receiving antenna may be embodied by different devices, and the transmitting antenna may include one or more transmitting sub-antennas and the receiving antenna may include one or more receiving sub-antennas. For example, the receiving antenna may include three or more antennas, for example receiving sub-antennas, that receive a radar reflection signal. In an example, the receiving sub-antennas may be separated from each other at the same intervals.

The radar sensor 310 may be, for example, a mmWave radar, and may estimate a range to an object by analyzing a time-of-flight (ToF), which is an amount of time used for a radiated electric wave to return after striking on the object. For example, the mmWave radar may detect a front side irrespective of a change in an external environment element, for example, fog, rain, and the like, compared to an optical sensor including, for example, a camera. In addition, the mmWave radar may be more effective in terms of performance relative to cost compared to a lidar sensor, and the mmWave radar may complement a flaw of the camera. The radar sensor 310 may be embodied as, for example, a frequency-modulated continuous-wave (FMCW) radar, but not limited thereto. The FMCW radar may be robust against external noise.

A chirp transmitter 311 of the radar sensor 310 may generate a frequency-modulated (FM) signal 302 of which a frequency changes over time. For example, the chirp transmitter 311 may generate the FM signal 302 by performing frequency modulation based on a frequency modulation model 301. The FM signal 302 may also be referred to as a chirp signal. The frequency modulation model 301 may be a model indicating a change in a carrier frequency of a radar transmission signal for a given transmission time. In the frequency modulation model 301, a vertical axis may indicate a carrier frequency and a horizontal axis may indicate time. For example, the frequency modulation model 301 may be a model having a pattern in which a carrier frequency changes linearly. For another example, the frequency modulation model 301 may be a model having a pattern in which a carrier frequency changes nonlinearly.

The frequency modulation model 301 illustrated in FIG. 3 may indicate a signal of which a frequency increases or decreases linearly over time. The chirp transmitter 311 may generate the FM signal 302 having a carrier frequency according to the frequency modulation model 301. For example, as illustrated in FIG. 3, the FM signal 302 may have a waveform of which a carrier frequency increases gradually in an interval, and a waveform of which the carrier frequency decreases gradually in a remaining interval. The chirp transmitter 311 may transmit the FM signal 302 to a duplexer 312.

The duplexer 312 of the radar sensor 310 may determine a transmission path and a reception path of a signal through the antenna 313. For example, while the radar sensor 310 is radiating the FM signal 302, the duplexer 312 may form a signal path from the chirp transmitter 311 to the antenna 313, and transmit the FM signal 302 to the antenna 313 through the formed signal path and then radiate the signal externally. While the radar sensor 310 is receiving a signal reflected from an object, the duplexer 312 may form a signal path from the antenna 313 to a spectrum analyzer 316. The antenna 313 may receive the reflected signal that is returned to the antenna 313 after the radiated signal that is transmitted from the antenna 313 arrives at the object and is then reflected from the object. The radar sensor 310 may transmit the reflected signal to the spectrum analyzer 316 through the signal path that is formed from the antenna 313 to the spectrum analyzer 316. The signal to be radiated through the antenna 313 may be referred to herein as a radar transmissions signal, and the signal to be received through the antenna 313 may be referred to herein as a radar reflection signal.

A frequency mixer 314 may demodulate a linear signal prior to the frequency modulation, for example, an original chirp signal, from the received signal. An amplifier 315 may amplify an amplitude of the demodulated linear signal.

The spectrum analyzer 316 may compare a frequency 308 of the radar reflection signal that is returned from an object after being reflected from the object, and a frequency 307 of the radar transmission signal. The frequency 307 of the radar transmission signal may change based on a carrier frequency change indicated by the frequency modulation model 301. The spectrum analyzer 316 may detect a difference between the frequency 308 of the radar reflection signal and the frequency 307 of the radar transmission signal. Referring to a graph 309 illustrated in FIG. 3, such a frequency difference between the radar transmission signal and the radar reflection signal may be constant during an interval in which a carrier frequency increases linearly along a time axis in the frequency modulation model 301, and be proportional to a range between the radar sensor 310 and the object. Thus, the range between the radar sensor 310 and the object may be derived from the frequency difference between the radar transmission signal and the radar reflection signal. The spectrum analyzer 316 may transmit analyzed information to a processor of a radar data processing device.

For example, the spectrum analyzer 316 may calculate a range between the radar sensor 310 and a target point as represented by Equation 1 below.

$$R = \frac{cT_{chirp}f_{IF}}{2B} \qquad \text{Equation 1}$$

In Equation 1, R denotes the range between the radar sensor 310 and the target point, and c denotes a speed of light. $T_{chirp}$ denotes a time length of an ascending interval of a carrier frequency in the frequency modulation model 301. $f_{IF}$ denotes a frequency difference between the radar transmission signal and the radar reflection signal at a point in the ascending interval, and is also referred to as a beat frequency or an intermediate frequency. B denotes a modulation bandwidth. The beat frequency $f_{IF}$ may be derived as represented by Equation 2 below.

$$f_{IF} = \frac{t_d B}{T_{chirp}} \qquad \text{Equation 2}$$

In Equation 2, $f_{IF}$ denotes the beat frequency. $t_d$ denotes a time difference, for example, a delay time, between a point in time at which the radar transmission signal is radiated and a point in time at which the radar reflection signal is received. The time difference may indicate a round-trip delay time for the target point.

In an example, a plurality of radar sensors may be installed in various portions of a vehicle, and the radar signal processing device may calculate a range to the target point, a direction, and a relative speed in all directions of the vehicle based on information sensed by the radar sensors. The radar signal processing device may be provided in the vehicle and provide various functions, for example, ACC, BSD, and lane change assistance (LCA), that are useful for the vehicle to travel, using such calculated information.

Each of the radar sensors may externally radiate a radar transmission signal including a chirp signal of which a frequency is modulated based on a frequency modulation model, and receive a radar reflection signal that is reflected from a target point. The processor of the radar signal processing device may determine a range to the target point from each of the radar sensors based on a frequency difference between the radiated radar transmission signal and the received radar reflection signal.

In addition, when the radar sensor 310 includes a plurality of receiving channels, the processor of the radar signal processing device may obtain an AoA of a radar reflection signal that is reflected from a target point. An example structure in which a radar sensor includes a plurality of receiving channels will be described hereinafter with reference to FIG. 4.

Figure 4:
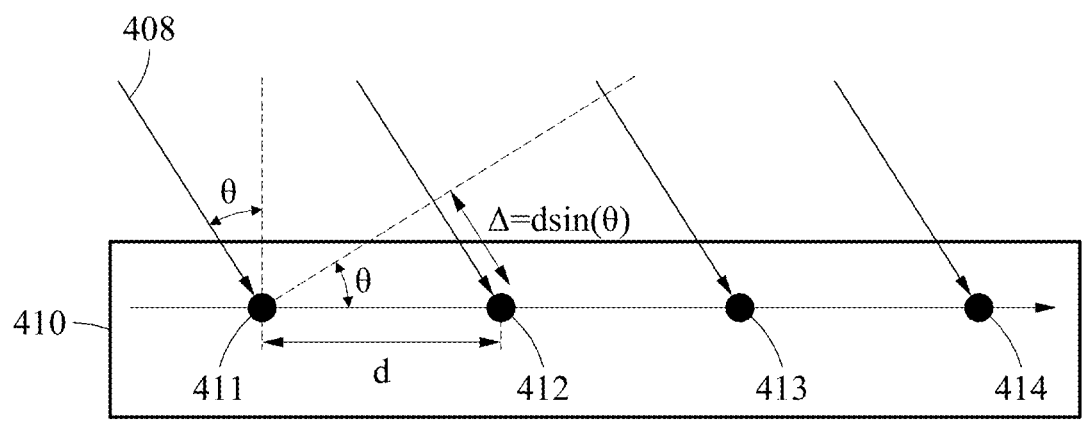
FIG. 4 illustrates an example of a receiving antenna array of a radar sensor.

FIG. 4 illustrates an example of a receiving antenna array of a radar sensor.

In an example, when a radar sensor includes a plurality of receiving channels, phase information of radar data may indicate a phase difference between a reference phase and a phase of a signal received through each of the receiving channels. The reference phase may be an arbitrary phase, or set to be a phase of a receiving channel from among the receiving channels. For example, a radar signal processing device may set a reference phase for one receiving sub-antenna to be a phase of a neighboring receiving sub-antenna of the receiving sub-antenna.

In addition, a processor of the radar signal processing device may generate, from the radar data, a radar vector of a dimension corresponding to the number of the receiving channels of the radar sensor. For example, in a case of the radar sensor including 4 receiving channels, the processor may generate a four-dimensional radar vector including a phase value corresponding to each of the receiving channels. The phase value corresponding to each of the receiving channels may be represented as a numerical value indicating such a phase difference described above.

For example, when the radar sensor includes one transmitting channel (indicated as Tx in the drawings) and four receiving channels, a radar signal radiated through the transmitting channel may be reflected from a target point and then received through the four receiving channels. In the example of FIG. 4, when a receiving antenna array 410 of the radar sensor includes a first receiving sub-antenna 411, a second receiving sub-antenna 412, a third receiving sub-antenna 413, and a fourth receiving sub-antenna 414, a phase of a signal to be received by the first receiving sub-antenna 411 may be set as a reference phase. In this example, when a radar reflection signal 408 that is reflected from the same target point is received by the receiving antenna array 410, an additional distance A between a distance or range from the target point to the first receiving sub-antenna 411 and a distance or range from the target point to the second receiving sub-antenna 412 may be represented by Equation 3 below.

$$A = d \cdot \sin(\theta) \qquad \text{Equation 3}$$

In Equation 3, θ denotes an AoA at which the radar reflection signal 408 is received from the target point. d denotes a distance or interval between receiving sub-antennas. c is a speed of light in the air, which is taken as a constant. c=fλ, and thus a phase change W in the second receiving sub-antenna 412 by the additional distance A may be derived as represented by Equation 4 below.

$$W = \frac{2\pi}{\lambda} d \cdot \sin(\theta) \qquad \text{Equation 4}$$

The phase change W may correspond to a phase difference between a signal waveform received by the first receiving sub-antenna 411 and a signal waveform received by the second receiving sub-antenna 412. In Equation 4, λ is inversely proportional to frequency f, which denotes a frequency of the radar reflection signal 408. When a carrier frequency change by a frequency modulation model is small, the frequency f in Equation 4 may be considered a single initial frequency, for example, $f_0$, in the frequency modulation model. Thus, when the phase change W is determined based on a received signal, the radar signal processing device may determine the AoA θ.

However, when a carrier frequency, for example, 77 GHz, of the frequency modulation model changes in a wide bandwidth of greater than or equal to 2 GHz, for example, 4 GHz, 5 GHz, or 7 GHz, such a carrier frequency change may not be considered insignificant, and thus an error in AoA and range estimation may occur. An error that may occur due to such a carrier frequency change will be described hereinafter with reference to FIG. 5.

Figure 5:
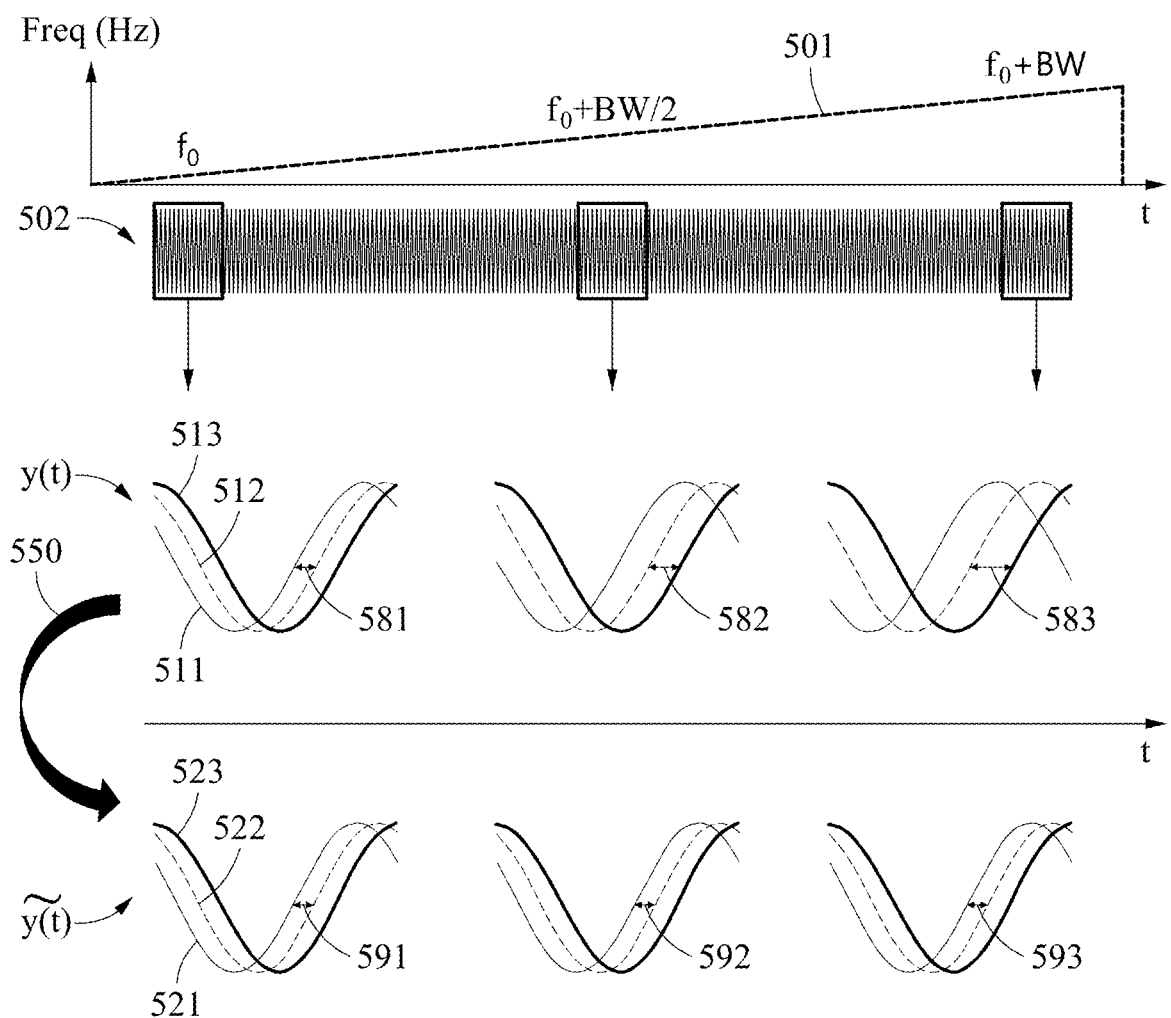
FIG. 5 illustrates an example of an error occurring by a change in a carrier frequency.

FIG. 5 illustrates an example of an error occurring by a change in a carrier frequency, in accordance with one or more embodiments.

In the example of FIG. 5, for the convenience of description a frequency modulation model 501 is described as having a pattern in which a carrier frequency increases linearly for a given transmission time. For example, a sampling interval in the frequency modulation model 501 may be an interval in which a frequency increases linearly from an initial frequency $f_0$ to a last frequency $f_0$+BW increased from the initial frequency $f_0$ by a bandwidth BW. In an example, the bandwidth BW may be a sampling bandwidth corresponding to the sampling interval, and less than a modulation bandwidth B described above with reference to Equation 1. A radar reflection signal 502 received by a radar sensor may indicate a frequency corresponding to a carrier frequency. The radar reflection signal 502 may be sensed individually by a plurality of receiving sub-antennas. A beat frequency signal y(t) of the radar reflection signal 502 that is sensed by a receiving sub-antenna of the radar sensor may be modeled as represented by Equation 5 below.

$$y(t) = \frac{\alpha}{2}\cos\left(-2\pi f_c t_d + \pi \frac{B}{T_c}t_d^2 - 2\pi \frac{B}{T_c}t_d t\right) \quad \text{Equation 5}$$

In Equation 5, $\alpha$ denotes a path loss attenuation, and $f_c$ denotes a carrier frequency of the radar reflection signal 502. $t_d$ denotes a round-trip delay in association with a target point that is separated by a range or distance R. B denotes a sweep bandwidth of a transmitted chirp. A form and the sweep bandwidth of the transmitted chirp may be defined by the frequency modulation model 501. $T_c$ denotes a chirp duration and may correspond to $T_{chirp}$ described above with reference to Equation 1. The round-trip delay $t_d$ in Equation 5 may be represented by Equation 6 below. "t" denotes a time point when the radar sensor receives the radar reflection signal 502.

$$t_d = \frac{2R}{c} = \frac{2(R^0 + R^\theta)}{c} = \frac{2R^0 + d\sin\theta}{c} = t_{d,0} + t_{d,\theta} \quad \text{Equation 6}$$

In Equation 6, $R^0$ denotes a range to the target point. c denotes a constant indicating a speed of light in the air, and d denotes a distance between receiving sub-antennas. $\theta$ denotes an AoA from the target point. $t_{d,0}$ of the round-trip delay $t_d$ denotes a component based on a range from the target point, and $t_{d,0}$ of the round-trip delay $t_d$ denotes a component based on an AoA. The range-based component and the AoA-based component in Equation 5 may be represented by Equations 7 through 10.

$$y(t) = \frac{\alpha}{2}\cos(\Phi_0 + \Phi_t(t_{d,0}) + \Phi_t(t_{d,\theta})) \quad \text{Equation 7}$$

$$\Phi_0 = -2\pi f_c t_{d,0} + \pi\frac{B}{T_c}t_{d,0}^2 - 2\pi f_c t_{d,\theta} + 2\pi\frac{B}{T_c}t_{d,0}t_{d,\theta} + \pi\frac{B}{T_c}t_{d,\theta}^2 \quad \text{Equation 8}$$

$$\Phi_t(t_{d,0}) = -2\pi\frac{B}{T_c}t_{d,0}t \quad \text{Equation 9}$$

$$\Phi_t(t_{d,\theta}) = -2\pi\frac{B}{T_c}t_{d,\theta}t \quad \text{Equation 10}$$

In Equation 8, values of terms $$2\pi\frac{B}{T_c}t_{d,0}t_{d,\theta}$$

and $$\pi\frac{B}{T_c}t_{d,\theta}^2$$

may be small and may be disregarded.

A radar signal processing device may detect a component $\phi_t(t_{d,0})$ in Equation 9 by performing a frequency analysis, for example, a Fourier transform, on a beat frequency signal sensed by each receiving sub-antenna. The radar signal processing device may estimate the range to the target point based on the component $\phi_1(t_{d,0})$. In addition, a component $\phi_0$ in Equation 8 may be a constant component, and thus the radar signal processing device may determine a phase change W between beat frequency signals received by receiving sub-antennas to be the component $\phi_0$ and estimate an AoA from the component $\phi_0$.

The radar reflection signal 502 corresponding to one chirp may be reflected from the same target point, and thus the round-trip delay may be the same. Due to the same round-trip delay, the radar signal processing device may calculate the same AoA at an initial point in time, an intermediate point in time, and an end point in time of the radar reflection signal 502. However, due to a component $\phi_t(t_{d,\theta})$ in Equation 10, the phase change W may vary over time even in one chirp, and thus an error of a varying AoA based on Equation 4 may occur. In the example of FIG. 5, the radar signal processing device may sense a first beat frequency signal 511, a second beat frequency signal 512, and a third beat frequency signal 513 through a first receiving sub-antenna, a second receiving sub-antenna, and a third receiving sub-antenna, respectively. In this example, in a chirp, a phase change 581 at an initial point, a phase change 582 at an intermediate point, and a phase change 583 at an end point may vary due to the component $\phi_t(t_{d,\theta})$ in Equation 10. This is because the component $\phi_t(t_{d,\theta})$ changes based on time t.

The radar signal processing device may generate radar data $\tilde{y}(t)$ in which a phase is normalized through a phase normalization operation 550 that normalizes a phase of a carrier frequency. In the phase normalized radar data $\tilde{y}(t)$, a first beat frequency signal 521, a second beat frequency signal 522, and a third beat frequency signal 523 may have the same phase changes 591, 592, and 593 in a chirp duration of the radar reflection signal 502 as illustrated in FIG. 5. Thus, the radar signal processing device may prevent an error in AoA estimation through phase normalization. Hereinafter, a method of compensating for an error that may occur due to a change in a carrier frequency through the phase normalization operation 550 will be described. Through the phase normalization operation 550, the component $\phi_t(t_{d,\theta})$ in Equation 10 may be filtered out.

The equations described above in relation to the example of FIG. 5 are provided to describe an error in AoA estimation that may occur due to a change in a carrier frequency. That is, an AoA that is calculated not by applying a carrier frequency that varies in a transmission band, but by assuming it as a constant, may produce an error due to the component $\phi_t(t_{d,\theta})$. In an example, the equations described above may not be used to calculate an actual AoA, but may be used to describe that one of the causes that produce such an AoA error may be a change in a carrier frequency that is not applied.

Figure 6:
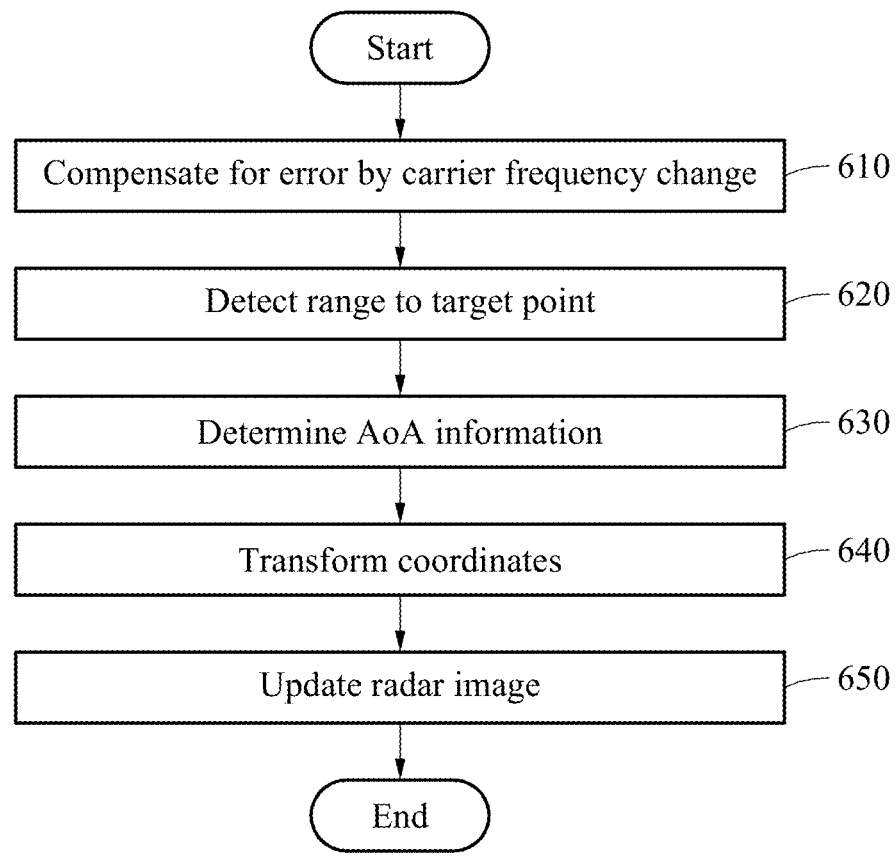
FIG. 6 illustrates an example of a method of updating a radar image.

FIG. 6 illustrates an example of a method of updating a radar image.

Referring to FIG. 6, in operation 610, a radar signal processing device compensates a beat frequency signal obtained from a radar signal for an error from a carrier frequency change. As described above, a radar reflection signal sensed by a radar sensor may indicate a signal that is obtained when a radar transmission signal is reflected from a target point, and thus a carrier frequency of the radar reflection signal may also change by a frequency modulation model. The radar signal processing device may generate radar data based on compensating for the carrier frequency change by the frequency modulation model for the beat frequency signal corresponding to a frequency difference between the radar transmission signal and the radar reflection signal. The radar data may be data indicating a beat frequency signal in which the error from the carrier frequency change is compensated for, and may also be referred to as normalized data. Hereinafter, the compensation for the carrier frequency change will be described in detail with reference to FIGS. 7 through 10.

In operation 620, the radar signal processing device detects a range to the target point. For example, the radar signal processing device may identify the range to the target point from which the radar transmission signal is reflected by processing the radar data generated in operation 610. In this example, the radar signal processing device may identify the range to the target point by performing a Fourier transform on the radar data. However, a method used to identify the range to the target point is not limited to the Fourier transform. For example, the radar signal processing device may identify the range from the radar data to the target point using a high-resolution range profile (HRRP).

In operation 630, the radar signal processing device determines AoA information. For example, the radar signal processing device may identify radar data of each target point based on steering information. The steering information may be information including a plurality of candidate steering vectors. For example, when radar data is received at a certain angle, a steering vector may include phase information calculated for the radar data. The radar signal processing device may identify, from the steering information including the candidate steering vectors, a target steering vector that matches the phase information of the radar data. The radar signal processing device may determine a steering angle corresponding to a target steering vector identified at each target range to be the AoA information of the radar data. The radar signal processing device may estimate the AoA information using techniques, such as, for example, a multiple signal classification (MUSIC) algorithm, a Bartlett algorithm, a minimum variance distortionless response (MVDR) algorithm, digital beamforming (DBF), estimation of signal parameters via rotational invariant techniques (ESPRIT).

In addition, the radar signal processing device may detect a potential object. For example, the radar signal processing device may select a target point corresponding to the potential object from among target points at which the AoA information is estimated in operation 630, and apply the selected target point to update a radar image map. The target point corresponding to the potential object may be a target point at which an object is expected to be present. For example, the radar signal processing device may select the target point within a field of view (FOV) of the radar sensor. The radar signal processing device may exclude a target point deviating from the FOV from operation 650 of updating the radar image map. To detect the potential object, the radar signal processing device may use a constant false alarm rate (CFAR) detection method and a joint probabilistic data association (JPDA) method, for example.

In operation 640, the radar signal processing device transforms coordinates of the target points. In an example, the radar signal processing device may generate coordinate information of a nearby object based on AoA information and ego-localization. For example, target points detected as the potential object may have relative coordinates that are defined by a range axis and an AoA axis relative to the radar sensor. The radar signal processing device may transform, into absolute coordinates, the relative coordinates of the target points identified by the radar data.

In operation 650, the radar signal processing device updates the radar image map. For example, the radar signal processing device may generate the radar image map from the coordinate information of the nearby object obtained in operation 640. The radar image map may be a map indicating target points detected in a surrounding environment, and indicating for example, absolute coordinates of the target points. The radar image map may include a plurality of spaces each indicating an object occupancy probability or a radar signal reception intensity. The object occupancy probability may be a probability that an object occupies an absolute coordinate indicated by each space. The radar signal reception intensity may be an intensity of a signal reflected and received from an absolute coordinate indicated by each space. In the radar image map, a map indicating the object occupancy probability may be referred to as an occupancy grid map (OGM), and a map indicating the radar signal reception intensity may be referred to as an intensity grid map (IGM). However, types of the radar image map are not limited to the example maps described in the foregoing.

In an example, the radar signal processing device may generate, as the radar image map for a current frame, a map indicating the object occupancy probability and/or the radar signal reception intensity for nearby points of the radar signal processing device from the AoA information. For example, the radar signal processing device may generate a radar scan image of the radar sensor based on the AoA information. In this example, the radar signal processing device may generate a radar image map associated with a situation or environment around the radar signal processing device based on radar scan images generated for a plurality of radar sensors. The radar signal processing device may generate a radar image map with an improved resolution using radar data of which an error by a carrier frequency change is compensated for.

However, an order of the operations is not limited to the order of the operations described above with reference to FIG. 6, and at least one of the operations may be performed along with another operation time-serially or in parallel. In addition, although the radar signal processing device is described above as calculating both the AoA information and the range information, the radar signal processing device may calculate one of these. The radar signal processing device may generate the radar image map of a surrounding environment based on the AoA information and/or the range information.

Figure 7:
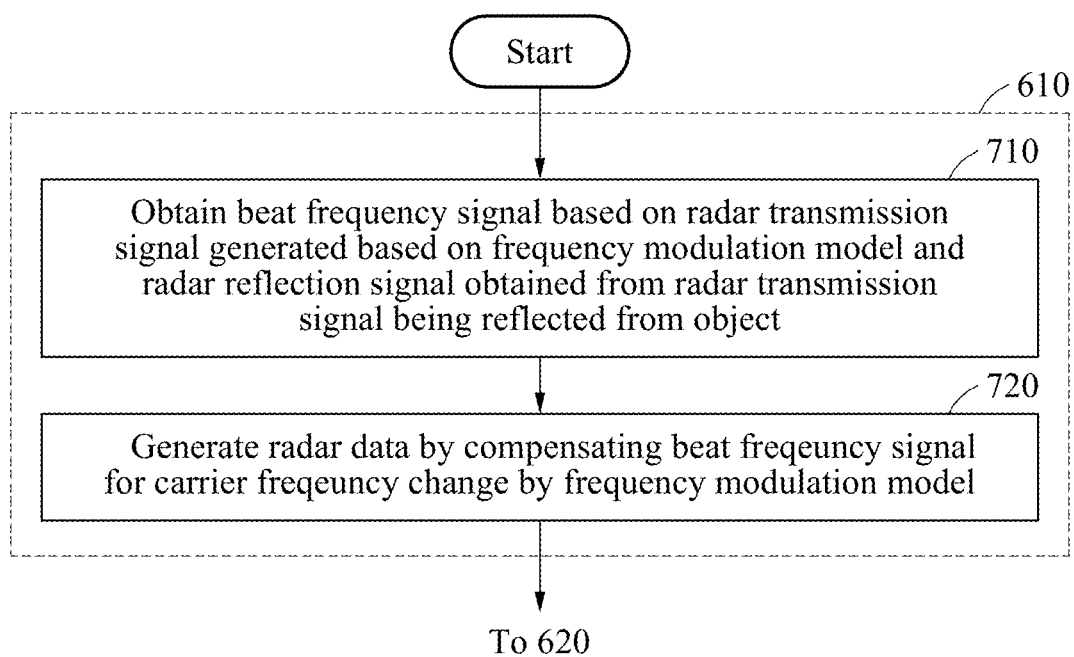
FIG. 7 illustrates an example of a radar signal processing method.
Figure 8:
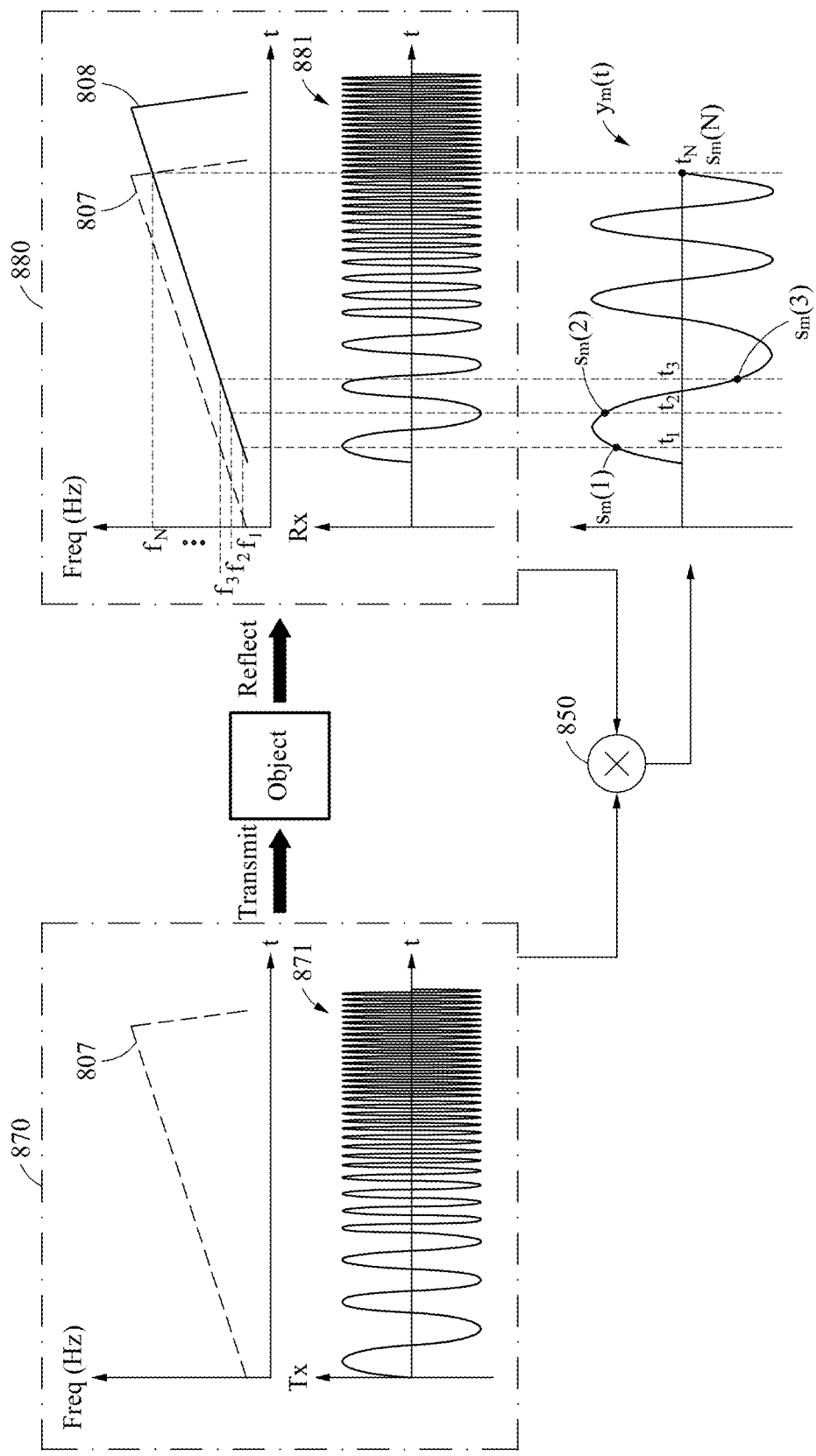
FIG. 8 illustrates an example of a phase change based on a carrier frequency change at each sampling point in a radar signal processing method.

FIG. 7 illustrates an example of a radar signal processing method. FIG. 8 illustrates an example of a phase change based on a carrier frequency change at each sampling point in a radar signal processing method.

Referring to FIGS. 7 and 8, in operation 710, a radar signal processing device obtains a beat frequency signal based on a radar transmission signal 870 generated based on a frequency modulation model and a radar reflection signal 880 obtained when the radar transmission signal 870 is reflected from an object. For example, the radar signal processing device may calculate the beat frequency signal corresponding to a difference between a frequency 807 of the radar transmission signal 870 and a frequency 808 of the radar reflection signal 880. The radar signal processing device may not directly measure a beat frequency $f_{IF}$, but measure a signal waveform 881 of the radar reflection signal 880. In addition, the radar signal processing device may generate the beat frequency signal based on a given signal waveform 871 of the radar transmission signal 870 and the signal waveform 881 of the radar reflection signal 880. The radar signal processing device may calculate the beat frequency signal through frequency mixing 850, for example, multiplication, of the radar transmission signal 870 and the radar reflection signal 880. In the example of FIG. 8, $y_m(t)$ denotes the beat frequency signal that is calculated from the radar transmission signal 870 and the radar reflection signal 880 that is received by an m-th receiving sub-antenna among M receiving sub-antennas. In this example, M denotes an integer greater than or equal to 2, and m denotes an integer greater than or equal to 1 and less than or equal to M. The radar transmission signal 870, the radar reflection signal 880, and the beat frequency signal are illustrated in FIG. 8 as having a frequency lower than an actual frequency for better understanding, and their frequencies are not limited to illustrated frequencies.

The radar signal processing device may obtain sampling data by sampling the beat frequency signal at a plurality of sampling points. The sampling data may include sampling values obtained from the preset sampling points. For example, referring to FIG. 8, $s_m(i)$ denotes a sampling value obtained by sampling an intensity of a signal received at an i-th sampling point by the m-th receiving sub-antenna among the M receiving sub-antennas. In this example, i denotes a time index, and N denotes the sampling number of the beat frequency signal. N is an integer greater than or equal to 1, and i is an integer greater than or equal to 1 and less than or equal to N.

Due to a carrier frequency change in the radar transmission signal 870 and the radar reflection signal 880, a phase change may vary for each sampling point. In the example of FIG. 8, the component $\phi_t(t_{d,\theta})$ of Equation 10 respectively corresponding to a first frequency $f_1$, a second frequency $f_2$, a third frequency $f_3$, . . . , and an N-th frequency $f_N$ may be applied respectively to a first sampling value $s_m(1)$ that is obtained through sampling at a first sampling point, a second sampling value $s_m(2)$ that is obtained through sampling at a second sampling point, a third sampling value $s_m(3)$ that is obtained through sampling at a third sampling point, . . . , and an N-th sampling value $s_m(N)$ that is obtained through sampling at an N-th sampling point. Due to such a frequency change for each sampling point, a frequency and a phase of the beat frequency signal may vary without being fixed as illustrated in FIG. 8. For the convenience of description, a time delay is explicitly illustrated between the radar transmission signal 870 and the radar reflection signal 880 in the example of FIG. 8. However, a radar signal may be transmitted or propagated at a speed of light, and thus the time delay may be extremely small and accordingly the frequency difference may also be extremely small. Thus, a carrier frequency of the radar transmission signal 870 and a carrier frequency of the radar reflection signal 880 may be considered substantially the same at a given sampling point.

In operation 720, the radar signal processing device generates radar data by compensating the beat frequency signal for a carrier frequency change by the frequency modulation model. The radar signal processing device may compensate a sampling value corresponding to each of the sampling points in the sampling data for an error that may occur by a carrier frequency corresponding to a corresponding sampling point. Here, the carrier frequency corresponding to the corresponding sampling point may be the frequencies $f_1, f_2, f_3, \ldots$, and $f_N$ corresponding to the sampling points of the frequency 808 of the radar reflection signal 880. However, as described above, the carrier frequency 807 of the radar transmission signal 870 and the carrier frequency 808 of the radar reflection signal 880 may be substantially the same. Thus, values of the frequency 807 of the radar transmission signal 870, instead of the frequency 808 of the radar reflection signal 880, may be used as the carrier frequency corresponding to the corresponding sampling point for such error compensation. Hereinafter, the compensation for an error that may occur by a carrier frequency will be described in detail with reference to FIGS. 9 and 10.

Although a radar signal processing method is mainly described herein, examples are not limited thereto. A phase normalization operation described above may be generally applied to a reflection signal that is received when a signal processing device configured to perform a signal processing method transmits a transmission signal of which a carrier frequency changes based on a frequency modulation model and the transmission signal is reflected from a target point. For example, the transmission signal and the reflection signal may be a signal that has a wave based on a carrier frequency and is propagated with the wave, and include, for example, a radar signal, an ultrasonic signal, an electromagnetic signal, and an optical signal.

Figure 9:
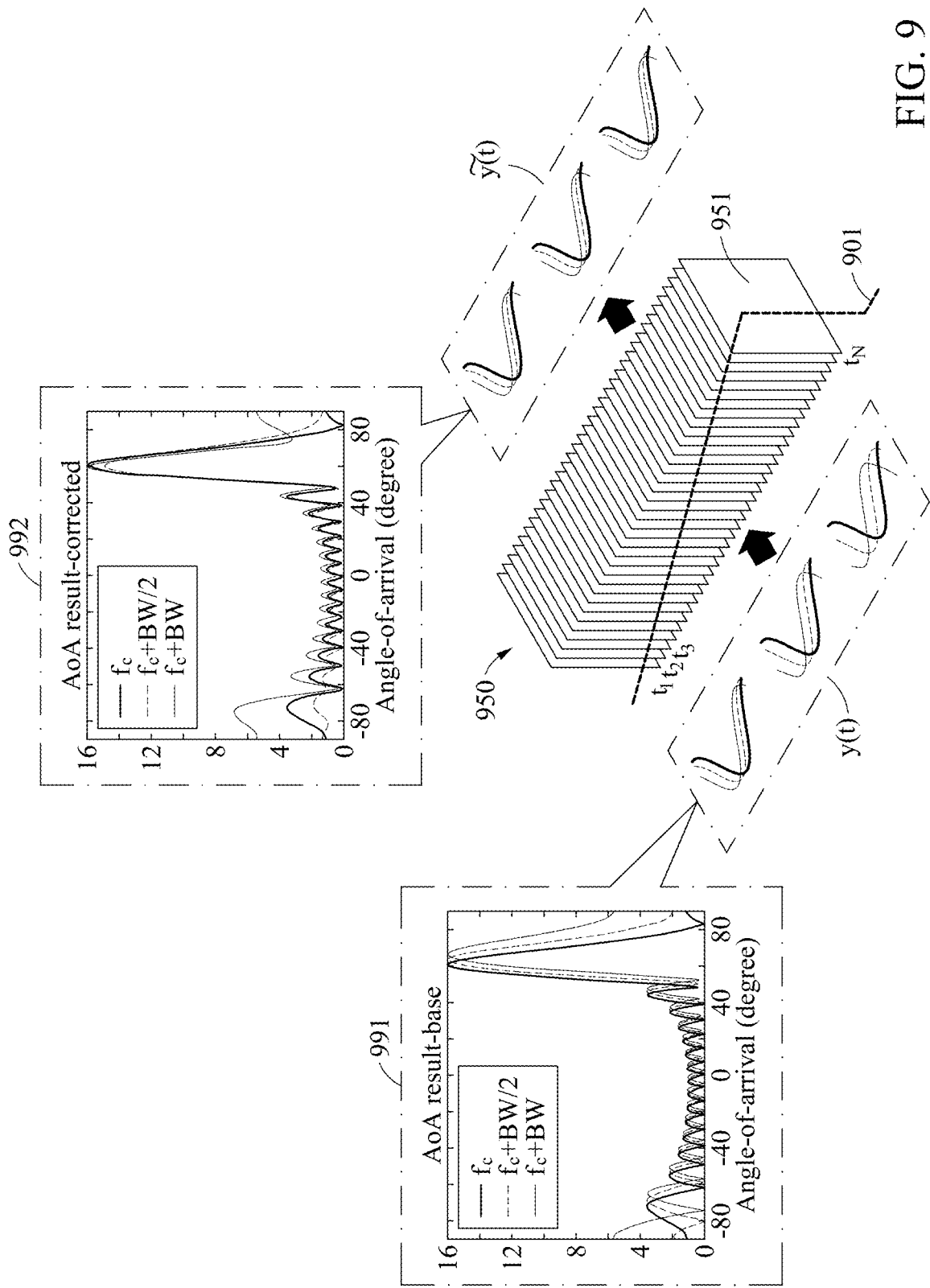
FIG. 9 illustrates an example of phase normalization of a radar signal.

FIG. 9 illustrates an example of phase normalization of a radar signal.

In an example, a radar signal processing device may apply a phase normalization model 950 to a beat frequency signal. The phase normalization model 950 may be a model that normalizes a carrier frequency of the beat frequency signal to be a reference frequency. For example, the phase normalization model 950 may be a model configured to normalize sampling data that is sampled for each time index in the beat frequency signal from a carrier frequency corresponding to a corresponding time index to be the reference frequency. The time index may be an index discretely indicating a time t which is an analog value. The time index may be determined in advance by the radar signal processing device. A carrier frequency corresponding to each time index may also be determined in advance. For example, the carrier frequency that is determined may be a frequency corresponding to each time index in the frequency 807 of the radar transmission signal 870 of FIG. 8. The phase normalization model 950 may include a plurality of phase normalization matrices 951 respectively corresponding to a plurality of sampling points of the beat frequency signal. Each of the phase normalization matrices 951 may be a matrix that normalizes, to be the reference frequency, a carrier frequency that changes according to a time index in a frequency modulation model 901. Referring back to FIG. 8, when a single beat frequency signal is sampled by N sampling points, a phase normalization matrix may be configured for each of the N sampling points, and a total of N phase normalization matrices may be configured. Among the N phase normalization matrices, an i-th phase normalization matrix corresponding to an i-th sampling point may include elements that compensate for an error by an i-th frequency that occurs in sampling values at the i-th sampling point.

For example, referring to FIG. 8, M sampling values may be obtained from M sub-antennas at each sampling point, and thus a total of M×N sampling values may be obtained at the N sampling points. For example, the frequency 807 of the radar transmission signal 870 and the frequency 808 of the radar reflection signal 880 may change by the frequency modulation model 901 of FIG. 9. In this example, a first phase normalization matrix for M sampling values (e.g., $s_1(1), s_2(1), \ldots$, and $s_M(1)$) at a first sampling point, a second phase normalization matrix for M sampling values (e.g., $s_1(2), s_2(2), \ldots$, and $s_M(2)$) at a second sampling point, a third phase normalization matrix for M sampling values (e.g., $s_1(3)$, $s_2(3)$, . . . , and $s_M(3)$) at a third sampling point, . . . , and an N-th phase normalization matrix for M sampling values (e.g., $s_1(N)$, $s_2(N)$, . . . , and $s_M(N)$) at an N-th sampling point may be configured. In this example, N denotes an integer greater than or equal to 1. A phase normalization matrix will be described in greater detail with reference to FIG. 10.

In an example, the radar signal processing device may apply, to sampling data corresponding to each sampling point in a beat frequency signal, a phase normalization matrix to which a frequency change at each sampling point is applied. Referring to an AoA estimation result 991 of FIG. 9, a beat frequency signal y(t) of which a phase is not yet normalized may have different AoAs for time indices, for example, a time index corresponding to $f_0$, a time index corresponding to $f_0+BW/2$, and a time index corresponding to $f_0+BW$. Referring to an AoA estimation result 992 derived from $\widetilde{y(t)}$ which is a result obtained by applying the phase normalization model 950 to the beat frequency signal y(t), the AoAs may be the same for all the time indices. Thus, the radar signal processing device may calculate an AoA of an object using a compensated beat frequency signal.

Figure 10:
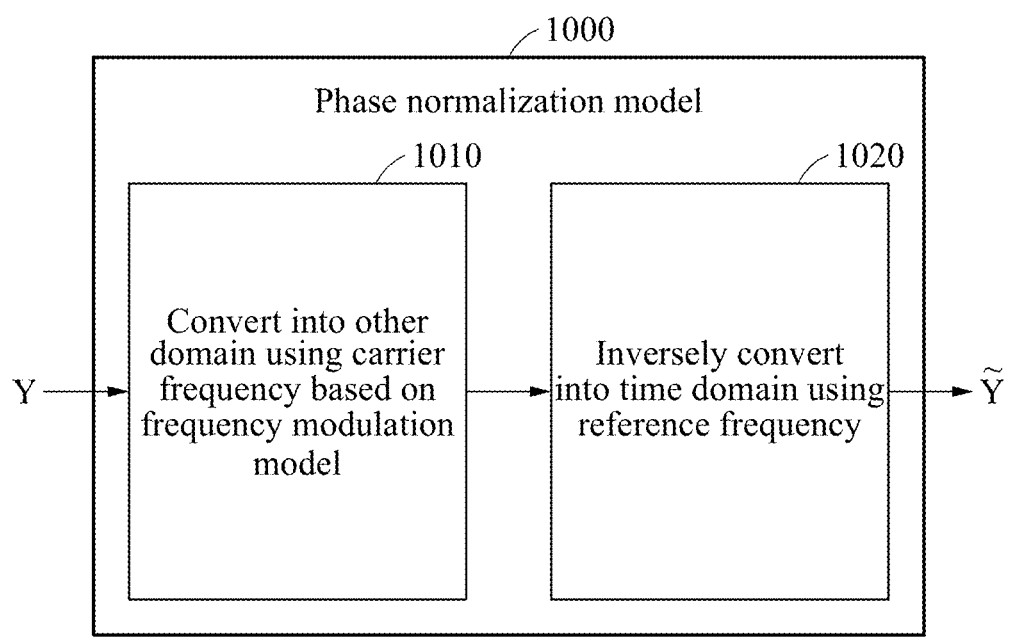
FIG. 10 illustrates an example of applying a phase normalization model to a beat frequency signal.

FIG. 10 illustrates an example of applying a phase normalization model to a beat frequency signal.

Referring to FIG. 10, a phase normalization model 1000 may include an operation in which a first operation 1010 that converts a beat frequency signal in a time domain to data in another domain based on a carrier frequency based on a frequency modulation model, and a second operation 1020 that inversely converts the data in the other domain into the time domain based on a reference frequency are combined. Through the first operation 1010, each sampling data in a beat frequency signal Y may be converted to data in another domain. The data in the other domain may indicate information corresponding to a same round-trip delay, for example, AoA information. Through the second operation 1020, the data in the other domain may be converted to a value in the time domain corresponding to the same reference frequency. The other domain may be an angle domain, for example.

For example, the beat frequency signal Y may be represented by Equation 11 below.

$$Y=[Y(1),Y(2),\ldots,Y(i),\ldots,Y(N-1),Y(N)] \quad \text{Equation 11}$$

In Equation 11, i denotes a time index, and N denotes the sampling number of a beat frequency signal. N is an integer greater than or equal to 1, and i is an integer greater than or equal to 1 and less than or equal to N. Y denotes data obtained by converting the beat frequency signal from an analog value to a digital value. For example, when a receiving antenna array of a radar sensor includes M receiving channel antennas, sampling data Y(i) at an i-th sampling point corresponding to a time index i may be represented by Equation 12 below.

$$Y(i)=[s_1(i),s_2(i),\ldots s_m(i),\ldots,s_{M-1}(i),s_M(i)]^T \quad \text{Equation 12}$$

In Equation 12, $s_m(i)$ denotes a value obtained by sampling an intensity of a signal received by an m-th receiving sub-antenna among M receiving sub-antennas at an i-th sampling point. M is an integer greater than or equal to 2, and m is an integer greater than or equal to 1 and less than or equal to M.

The phase normalization model 1000 may be represented by Equation 13 below.

$$A_{pNorm}=\{A_{pNorm,1},\ldots,A_{pNorm,i}\ldots,A_{pNorm,N}\} \quad \text{Equation 13}$$

In Equation 13, $A_{pNorm,i}$ denotes an i-th phase normalization matrix to be applied to a sampling value (e.g., i-th sampling vector described above with reference to Equation 12) at an i-th sampling point of sampling data. The i-th phase normalization matrix may be represented by Equation 14 below.

$$A_{pNorm,i}=A_{f_0}^{-1}A_{f_i} \quad \text{Equation 14}$$

In Equation 14, $A_{f_i}$ denotes a first matrix operation that converts a time-domain value corresponding to an i-th sampling point of sampling data to an other-domain value (e.g., angle information) using a carrier frequency corresponding to the i-th sampling point of a frequency modulation model. $A_{f_0}^{-1}$ denotes an inverse matrix of $A_{f_0}$, and a second matrix operation that converts the other-domain value (e.g., angle information) to a time-domain value using a reference frequency $f_0$. The phase normalization matrix $A_{pNorm,i}$ corresponding to each sampling point may be a matrix in which the first matrix operation and the second matrix operation described above with reference to Equation 14 are combined together. The first matrix operation $A_{f_i}$ of Equation 14 may be represented by Equations 15 and 16 below.

$$A_{f_i} = [\alpha_{f_i}(\theta_1), \ldots, \alpha_{f_i}(\theta_k), \ldots, \alpha_{f_i}(\theta_K)]^T \quad \text{Equation 15}$$

$$\alpha_{f_i}(\theta_k) = \left[1, e^{\frac{j2\pi d}{\lambda_{f_i}}\sin\theta_k}, \ldots, e^{\frac{j2\pi(M-1)d}{\lambda_{f_i}}\sin\theta_k}\right] \quad \text{Equation 16}$$

In Equation 15, the first matrix operation $A_{f_i}$ may be represented by a steering vector set $\alpha_{f_i}(\theta_k)$. K is an integer greater than or equal to 1, and k is an integer greater than or equal to 1 and less than or equal to K. For example, when an FOV of a radar sensor is 180° and K steering vectors are linearly arranged within the FOV, an AoA resolving power may be 0.35°. In this example, K may be 512. However, examples are not limited to the foregoing example. For another example, an AoA resolving power may be 1° when K is 180, and an AoA resolving power may be 0.5° when K is 360. K may be determined based on a desired AoA resolving power, for example, less than or equal to 1°. In Equation 16, d denotes a distance or an interval between receiving sub-antennas of an antenna array included in the radar sensor, and j denotes an imaginary unit. $\lambda_{f_i}$ denotes a wavelength corresponding to a carrier frequency at an i-th sampling point, and $\theta_k$ denotes a k-th steering angle in $A_{f_i}$. $\alpha_{f_i}(\theta_k)$ denotes a steering vector corresponding to a steering angle $\theta_k$ of a carrier frequency corresponding to an i-th time index of the frequency modulation model.

$A_{f_i}$ may be a K×M matrix including K rows and M columns. A result $A_{f_i}Y(i)$ of matrix multiplication between the steering matrix $A_{f_i}$ in Equation 15 and Y(i) of Equation 12 may be calculated as a K×1 dimensional vector. A k-th row element in the matrix multiplication result $A_{f_i}Y(i)$ may be a value corresponding to a probability that an AoA of Y(i) corresponds to a k-th steering angle $\theta_k$, and may indicate angle information. Thus, a result of applying the first matrix operation to the i-th sampling data Y(i) may indicate angle information corresponding to an i-th time index.

For example, when the second matrix operation $A_{f_0}^{-1}$ is applied to the angle information, frequencies of time-domain values of sampling data may be unified into a same reference frequency $f_0$. The reference frequency may be determined to be an arbitrary frequency, for example, a carrier frequency $f_c$ in an i-th time index. Thus, a radar signal processing device may calculate or obtain radar data $\widetilde{Y(i)}$ of which a phase is normalized in the i-th time index by applying the i-th phase normalization matrix $A_{pNorm,i}$ in which the first matrix operation and the second matrix operation are combined to the i-th sampling value, as represented by Equation 17 below.

$$\widetilde{Y(i)} = A_{pNorm,i} Y(i) \qquad \text{Equation 17}$$

The phase normalization model 1000 may include a phase normalization matrix (for example, N phase normalization matrices in a case of N sampling points) in which the first matrix operation and the second matrix operation are combined through matrix multiplication for each of sampling points of a beat frequency signal. The radar signal processing device may generate radar data $\hat{Y}$ of which a phase is normalized by applying first through N-th phase normalization matrices to sampling data at the sampling points, respectively.

Although the first operation 1010 and the second operation 1020 are illustrated in sequential order in FIG. 10 for the convenience of description, examples are not limited thereto. For example, as represented in the foregoing equations, the phase normalization model 1000 in which the first operation 1010 and the second operation 1020 are combined by matrix multiplication may be immediately applied to beat frequency data Y.

As described above, a phase normalization matrix may be calculated in advance and stored when sampling points and steering angles are determined by the radar signal processing device. Further, carrier frequencies corresponding to the sampling points may also be obtained from the frequency modulation model, and thus the phase normalization matrix represented by Equations 15 and 16 above may be calculated in advance and stored, and applied immediately to obtained sets of beat frequency data.

Figure 11:
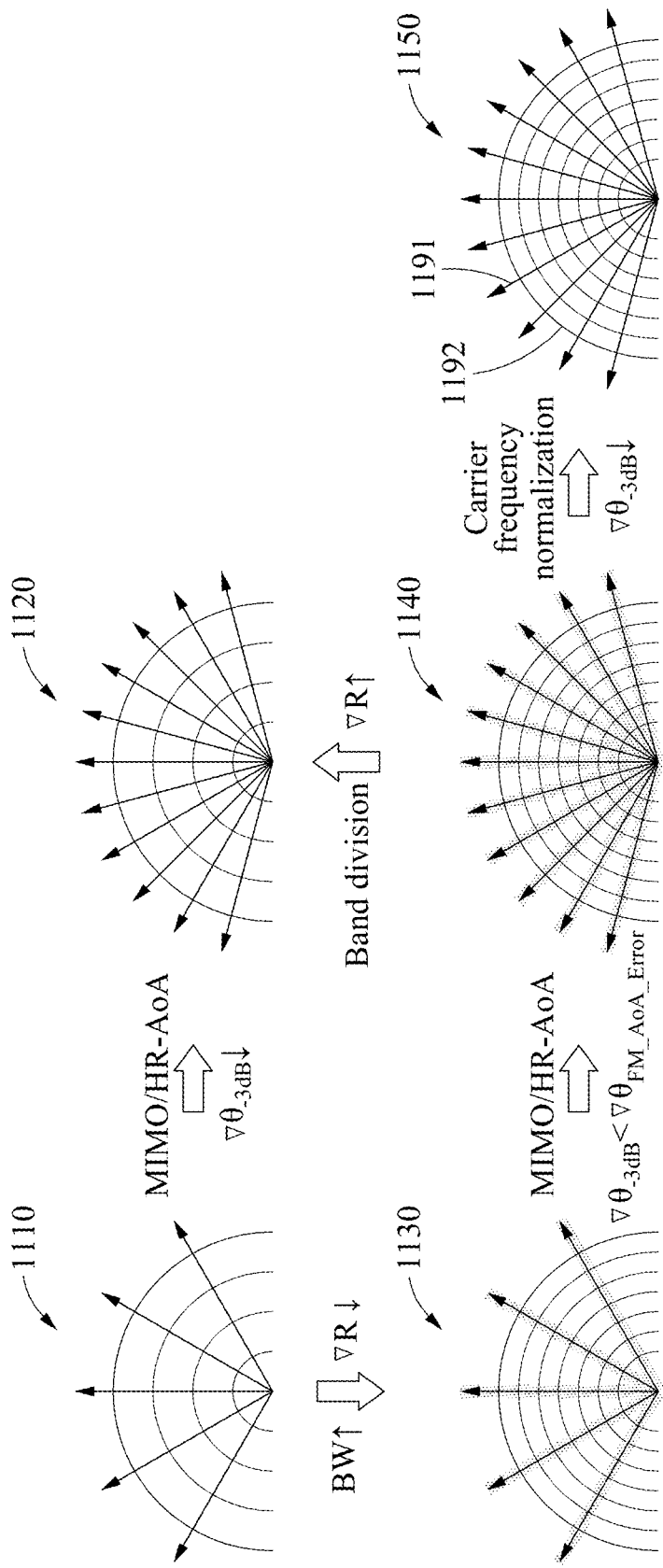
FIG. 11 illustrates an example of an angular resolving power and a range resolving power that are improved by phase normalization.

FIG. 11 illustrates an example of an angular resolving power and a range resolving power that are improved by phase normalization.

A radar signal processing device may determine, to be an AoA, an angle indicated by a steering vector among a plurality of steering vectors 1191, and determine that a target point is in a range among a plurality of identifiable ranges 1192. Thus, an angular resolving power $\nabla\theta_{-3\ dB}$ may correspond to an angle difference between the steering vectors 1191, and a range resolving power $\nabla R$ may correspond to a range difference between the identifiable ranges 1192. In an example, when the angular resolving power $\nabla\theta_{-3\ dB}$ decreases, the radar signal processing device may identify two target points disposed at a smaller angle interval. In an example, when the range resolving power $\nabla R$ decreases, the radar signal processing device may identify two target points disposed at a smaller range interval.

First steering information 1110 may indicate an angular resolving power $\nabla\theta_{-3\ dB}$ and a range resolving power $\nabla R$ in radar signal processing in a general narrowband. In the narrowband, the angular resolving power $\nabla\theta_{-3\ dB}$ and the range resolving power $\nabla R$ may be great. Third steering information 1130 with a bandwidth increased compared to that in the case of the first steering information 1110 may indicate that the range resolving power $\nabla R$ is reduced and improved thereby. However, in the third steering information 1130, an angle error $\nabla\theta_{FM\_AoA\_Error}$ may occur by a carrier frequency change as described above with reference to FIG. 5, and thus the angular resolving power $\nabla\theta_{-3\ dB}$ may be blurred. In fourth steering information 1140 to which multiple input, multiple output (MIMO) is applied to improve the angular resolving power $\nabla\theta_{-3\ dB}$ of the third steering information 1130, an angle error $\nabla\theta_{FM\_AoA\_Error}$ by a carrier frequency change may be greater than the improved angular resolving power $\nabla\theta_{-3\ dB}$. By applying MIMO, a high-resolution AoA may be estimated. However, the number of transmitting and receiving antennas may increase, and thus a hardware size may increase. By dividing a band to remove the angle error $\nabla\theta_{FM\_AoA\_Error}$ of the fourth steering information 1140, the range resolving power may increase and be degraded thereby as in the second steering information 1120.

As described above with reference to FIGS. 1 through 9, the radar signal processing device may compensate a beat frequency signal for an error by a carrier frequency change. Through the compensation, both the range resolving power $\nabla R$ and the angular resolving power $\nabla\theta_{-3\ dB}$ of steering information 1150 may be improved. Thus, the radar signal processing device may estimate a more accurate elevation angle and height of an obstacle in the air (e.g., a ceiling of a tunnel and traffic lights) that is disposed in a target range and separated from the ground by a certain height, and prevent a collision with the obstacle by notifying a vehicle of a result of the estimation or controlling the vehicle based on the result of the estimation.

Figure 12:
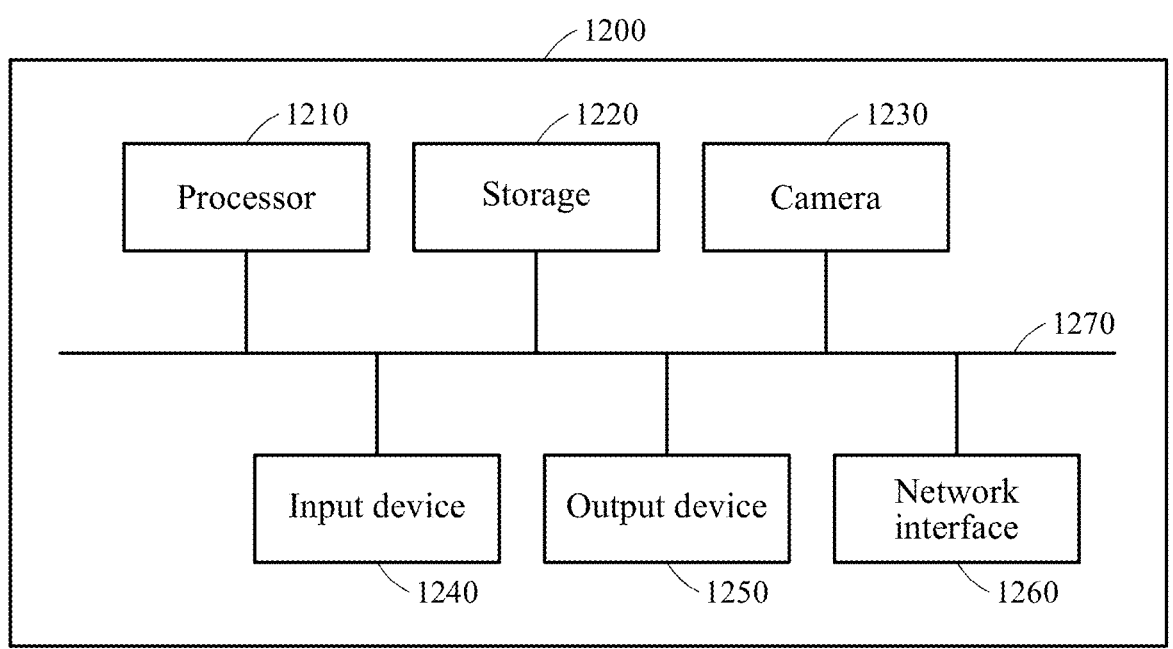
FIG. 12 illustrates another example of a radar signal processing device.

FIG. 12 illustrates another example of a radar signal processing device.

A computing device 1200 may be a device configured to process a radar signal using a radar signal processing method described above. In an example, the computing device 1200 may correspond to the radar signal processing device 200 described above with reference to FIG. 2. The computing device 1200 may be a device, such as, for example, an image processing device, a smartphone, a wearable device, a tablet computer, a netbook, a laptop, a desktop, a personal digital assistant (PDA), a head-mounted display (HMD), a digital camera, a global positioning system (GPS) navigation, a personal navigation device, portable navigation device (PND), a television (TV), a smart vacuum cleaner, a smart home device, a walking assistance device, a robot, a self-driving vehicle, and a driving assist device provided in a vehicle.

Referring to FIG. 12, the computing device 1200 includes a processor 1210, a storage 1220, a camera 1230, an input device 1240, an output device 1250, and a network interface 1260. The processor 1210, the storage 1220, the camera 1230, the input device 1240, the output device 1250, and the network interface 1260 may communicate with one another through a communication bus 1270.

The processor 1210 may execute functions and instructions in the computing device 1200. For example, the processor 1210 may process instructions stored in the storage 1220. The processor 1210 may perform one or more, or all, of operations described above with reference to FIGS. 1 through 11.

The storage 1220 may store information or data needed for the processor 1210 to process. For example, a precalculated phase normalization matrix may be stored in the storage 1220. The storage 1220 may include a non-transitory computer-readable storage medium or device, for example, a random-access memory (RAM), a dynamic RAM (DRAM), a static RAM (SRAM), a magnetic hard disk, an optical disc, a flash memory, an electrically erasable programmable read-only memory (EPROM), a floppy disk, and other types of computer-readable storage medium that are well-known in the related technical field. The storage 1220 may store the instructions to be executed by the processor 1210, and store related information while software or an application is being executed by the computing device 1200.

The camera 1230 may capture an image including a plurality of image frames. For example, the camera 1230 may generate a frame image.

The input device 1240 may receive an input from a user through a tactile input, a video input, an audio input, or a touch input. The input device 1240 may include, for example, a keyboard, a mouse, a touchscreen, a microphone, and other devices that may detect the input from the user and transmit the detected input.

The output device 1250 may provide an output of the computing device 1200 to a user through a visual, auditory, or tactile channel. The output device 1250 may include, for example, a display, a touchscreen, a speaker, a vibration generator, and other devices that may provide the user with the output. The network device 1260 may communicate with an external device through a wired or wireless network. In an example, the output device 1250 may provide a user with a result of processing a radar signal using at least one of visual information, auditory information, or haptic information. For example, when the computing device 1200 is provided in a vehicle, the computing device 1200 may visualize a radar image map through a display. For another example, the computing device 1200 may change at least one of a speed or velocity, an acceleration, or steering of the vehicle in which the computing device 1200 is provided based on AoA information, range information, and/or the radar image map. However, examples are not limited to the examples described in the foregoing, and the computing device 1200 may perform functions, such as, for example, ACC, BSD, LCA, autonomous emergency braking (AEB), and ego-localization.

The radar signal processing device 200, spectrum analyzer 316, chirp transmitter 311, and other apparatuses and devices, units, modules, and components described herein with respect to FIGS. 2, 3, and 12 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, multiple-instruction multiple-data (MIMD) multiprocessing, a controller and an arithmetic logic unit (ALU), a DSP, a microcomputer, an FPGA, a programmable logic unit (PLU), a central processing unit (CPU), a graphics processing unit (GPU), a neural processing unit (NPU), or any other device capable of responding to and executing instructions in a defined manner.

The methods illustrated in FIGS. 1-11 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the radio detection and ranging (radar) signal processing method. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A radio detection and ranging (radar) signal processing method, comprising:
    obtaining a beat frequency signal based on a chirp signal of a radar transmission signal generated based on a frequency modulation model and a radar reflection signal obtained from the radar transmission signal being reflected from an object; and
    generating radar data by normalizing a phase change between the beat frequency signal and another beat frequency signal based on a change in a carrier frequency of the chirp signal, such that the phase change is a same value at each of a plurality of sampling points of the chirp signal.

2. The radar signal processing method of claim 1, wherein the generating of the radar data comprises:
    applying, to the beat frequency signal, a phase normalization model configured to normalize a phase of the beat frequency signal based on a reference frequency.

3. The radar signal processing method of claim 2, wherein the phase normalization model comprises combining a result of converting the beat frequency signal in a time domain to data in another domain based on a carrier frequency based on the frequency modulation model, and a result of inversely converting the data in the other domain into the time domain based on the reference frequency.

4. The radar signal processing method of claim 3, wherein the other domain comprises an angle domain.

5. The radar signal processing method of claim 2, wherein the phase normalization model comprises phase normalization matrices respectively corresponding to the sampling points of the beat frequency signal.

6. The radar signal processing method of claim 2, wherein the phase normalization model comprises:
    a first matrix operation that converts a value in a time domain corresponding to each of the sampling points of the beat frequency signal to angle information using a carrier frequency corresponding to a corresponding sampling point of the frequency modulation model; and
    a second matrix operation that inversely converts the angle information into the time domain using the reference frequency.

7. The radar signal processing method of claim 1, further comprising:
    radiating the radar transmission signal comprising a chirp signal of which a carrier frequency is modulated based on the frequency modulation model; and
    sensing the radar reflection signal.

8. The radar signal processing method of claim 7, wherein the sensing of the radar reflection signal comprises:
    sensing the radar reflection signal individually by receiving sub-antennas in a radar sensor.

9. The radar signal processing method of claim 1, wherein the obtaining of the beat frequency signal comprises:
    calculating the beat frequency signal corresponding to a frequency difference between the radar transmission signal and the radar reflection signal.

10. The radar signal processing method of claim 1, wherein the frequency modulation model is a model having a pattern in which a carrier frequency changes linearly or a model having a pattern in which a carrier frequency changes nonlinearly.

11. The radar signal processing method of claim 1, further comprising:
    calculating at least one of angle-of-arrival (AoA) information or range information from the radar data.

12. The radar signal processing method of claim 11, further comprising:
    generating a radar image map of a surrounding based on the at least one of the AoA information or the range information.

13. The radar signal processing method of claim 12, further comprising:
    visualizing the radar image map through a display.

14. The radar signal processing method of claim 11, further comprising:
    changing at least one of a speed, an acceleration, or steering of a vehicle based on the at least one of the AoA information or the range information.

15. A non-transitory computer-readable storage medium storing instructions that, when executed by a processor, cause the processor to perform the radar signal processing method of claim 1.

16. A radio detection and ranging (radar) signal processing device, comprising:
   a radar sensor configured to radiate a radar transmission signal generated based on a frequency modulation model, and to sense a radar reflection signal from the radar transmission signal being reflected from an object; and
   a processor configured to
      obtain a beat frequency signal based on a chirp signal of the radar transmission signal and the radar reflection signal,
      generate radar data by normalizing a phase change between the beat frequency signal and another beat frequency signal based on a change in a carrier frequency of the chirp signal, such that the phase change is a same value at a plurality of sampling points of the chirp signal, and
      calculate at least one of angle-of-arrival (AoA) information or range information from the radar data.

17. A signal processing method comprising:
   generating and radiating a chirp signal of transmission signal of which a frequency changes within a band;
   obtaining a reflection signal from the transmission signal being reflected from an object;
   obtaining a beat frequency signal at sampling points based on the transmission signal and the reflection signal;
   normalizing a phase change between the beat frequency signal and another beat frequency signal based on a change in a carrier frequency of the chirp signal, such that the phase change is a same value at of each of a plurality of sampling points of the chirp signal; and
   calculating an angle-of-arrival (AoA) of the object using the normalized beat frequency signal.

18. The signal processing method of claim 17, wherein the band is greater than or equal to 2 gigahertz (GHz).

19. The signal processing method of claim 17, wherein at least three antennas obtain the reflection signal.

20. The signal processing method of claim 19, wherein the antennas are equidistant from each other.

21. The signal processing method of claim 17, wherein a frequency of the transmission signal changes linearly in the band.

22. The signal processing method of claim 17, wherein a resolving power of the AoA is less than or equal to 1 degree)(°).

23. The signal processing method of claim 17, wherein the normalizing of the sampling points of the beat frequency signal comprises:
   applying a phase normalization matrix to which a frequency change at each of the sampling points to sampling data corresponding to a corresponding sampling point of the beat frequency signal.

24. The signal processing method of claim 23, wherein the phase normalization matrix corresponding to each of the sampling points is a matrix based on a combination of a first matrix operation that converts a value in a time domain corresponding to the sampling point in the sampling data to a value in another domain using a frequency at the sampling point and a second matrix operation that inversely converts the value in the other domain into the time domain using a reference frequency.

25. The signal processing method of claim 24, wherein the other domain comprises an angle domain.

* * * * *